(12) United States Patent
Olmstead et al.

(10) Patent No.: US 8,356,749 B2
(45) Date of Patent: Jan. 22, 2013

(54) IMAGING SCANNER-SCALE WITH LOW VERTICAL PROFILE

(75) Inventors: Bryan L. Olmstead, Eugene, OR (US); Benjamin K. Roberts, Aloha, OR (US)

(73) Assignee: Datalogic ADC, Inc., Eugene, OR (US)

(*) Notice: Subject to any disclaimer, the term of this patent is extended or adjusted under 35 U.S.C. 154(b) by 107 days.

(21) Appl. No.: 12/774,633

(22) Filed: May 5, 2010

(65) Prior Publication Data

US 2010/0282850 A1 Nov. 11, 2010

Related U.S. Application Data

(60) Provisional application No. 61/175,849, filed on May 6, 2009.

(51) Int. Cl.
*G06K 15/00* (2006.01)
*G06K 7/00* (2006.01)

(52) U.S. Cl. .......................... 235/383; 235/439; 235/440

(58) Field of Classification Search ............. 235/462.11, 235/462.14, 462.32, 462.35–462.39, 462.41, 235/439, 440, 454, 470, 383; 250/234–236; 177/126, 239, 245, 180–182; *G06K 7/10*
See application file for complete search history.

(56) References Cited

U.S. PATENT DOCUMENTS

| | | | |
|---|---|---|---|
| 4,652,732 A | 3/1987 | Nickl | |
| 4,799,164 A | 1/1989 | Hellekson et al. | |
| 4,861,973 A | 8/1989 | Hellekson et al. | |
| 5,268,565 A | 12/1993 | Katoh et al. | |
| 5,410,108 A | 4/1995 | Williams et al. | |
| 5,498,862 A * | 3/1996 | Edler | 235/462.34 |
| 5,510,581 A * | 4/1996 | Angel | 177/211 |
| 5,936,218 A * | 8/1999 | Ohkawa et al. | 235/462.01 |
| 6,188,500 B1 | 2/2001 | Rudeen et al. | |
| 6,237,852 B1 * | 5/2001 | Svetal et al. | 235/462.43 |
| 6,330,973 B1 | 12/2001 | Bridgelall et al. | |
| 6,830,186 B1 | 12/2004 | Nahar | |
| 7,191,947 B2 | 3/2007 | Kahn et al. | |
| RE40,071 E | 2/2008 | Svetal et al. | |
| 7,367,499 B2 * | 5/2008 | Jwo | 235/383 |
| 7,780,086 B2 * | 8/2010 | Barkan et al. | 235/462.32 |
| 7,780,087 B2 | 8/2010 | Bobba et al. | |
| D631,478 S | 1/2011 | McQueen et al. | |
| D642,178 S | 7/2011 | McQueen | |
| 8,033,472 B2 * | 10/2011 | Giebel et al. | 235/462.42 |
| 2004/0232243 A1 * | 11/2004 | Silverbrook et al. | 235/470 |
| 2006/0278708 A1 * | 12/2006 | Olmstead | 235/454 |
| 2008/0017715 A1 | 1/2008 | Knowles et al. | |

(Continued)

*Primary Examiner* — Michael G Lee
*Assistant Examiner* — Suezu Ellis
(74) *Attorney, Agent, or Firm* — Stoel Rives LLP

(57) ABSTRACT

An integrated scanner and scale is provided having a thin profile and incorporating imaging technology to scan and read optical codes. The scanner-scale is sufficiently thin to allow a cash drawer to fit beneath the scanner-scale in a check stand. Side imagers are positioned and configured to scan multiple sides of an item. The field of view (FOV) of each imager defines at least a portion of a scan volume, wherein scanning is nearest to optimal. One or more imagers can be positioned on the checker side and the customer side, such that an optical path (or a portion thereof) from the scan volume to the one or more imagers is positioned entirely above a platter of the scanner. Mirrors fold and direct the optical path to direct the FOV of a bottom imager such that the bottom imager is positioned sufficiently close to the platter to allow the scanner-scale to have a thin profile.

25 Claims, 23 Drawing Sheets

U.S. PATENT DOCUMENTS

| | | |
|---|---|---|
| 2008/0017716 A1 | 1/2008 | Knowles et al. |
| 2008/0023558 A1 | 1/2008 | Knowles et al. |
| 2008/0029605 A1 | 2/2008 | Knowles et al. |
| 2008/0110992 A1 | 5/2008 | Knowles et al. |
| 2008/0110994 A1 | 5/2008 | Knowles et al. |
| 2008/0128509 A1 | 6/2008 | Knowles et al. |
| 2008/0142596 A1 | 6/2008 | Knowles et al. |
| 2008/0169348 A1 | 7/2008 | Knowles et al. |
| 2009/0020612 A1* | 1/2009 | Drzymala et al. ....... 235/462.32 |
| 2011/0168780 A1 | 7/2011 | McQueen et al. |

* cited by examiner

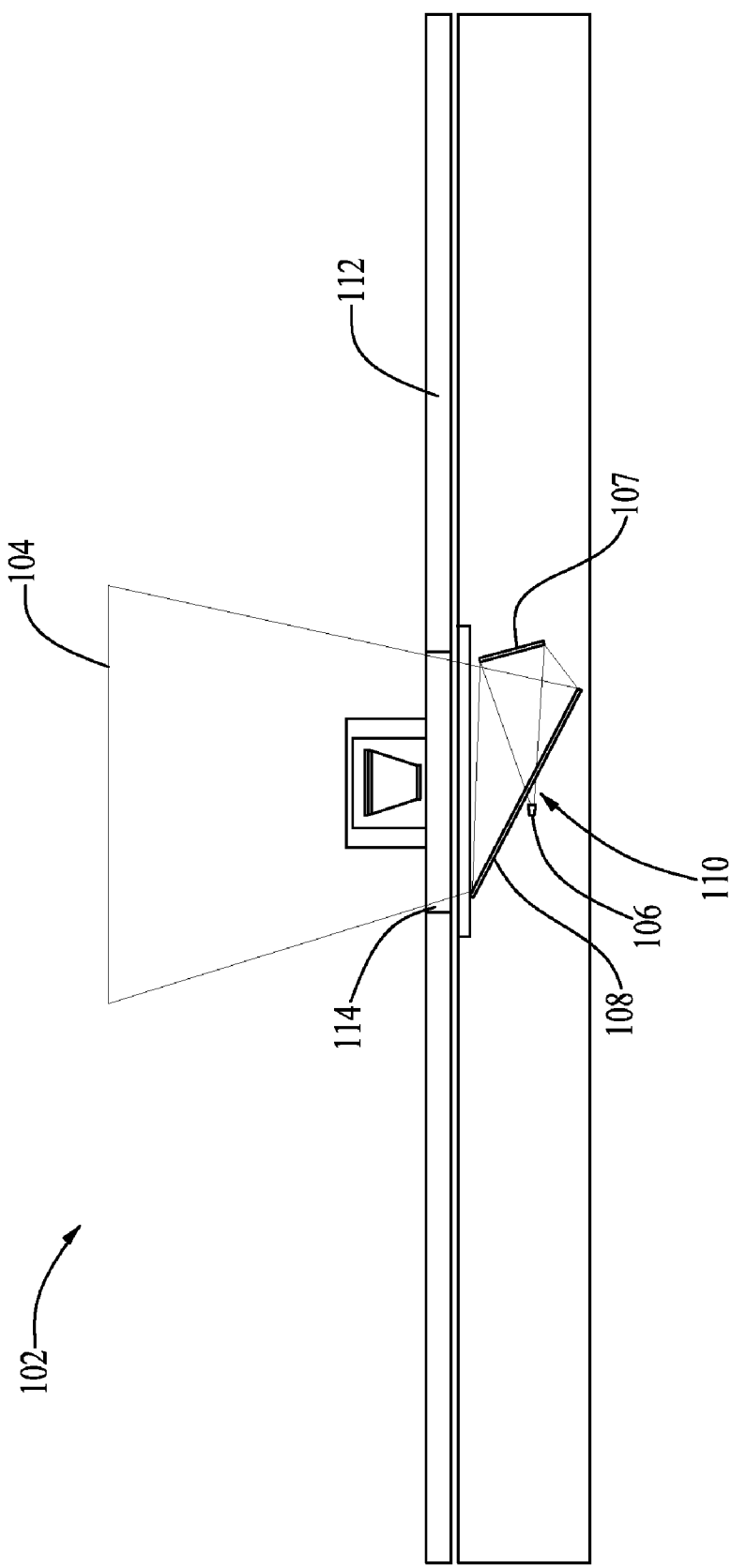

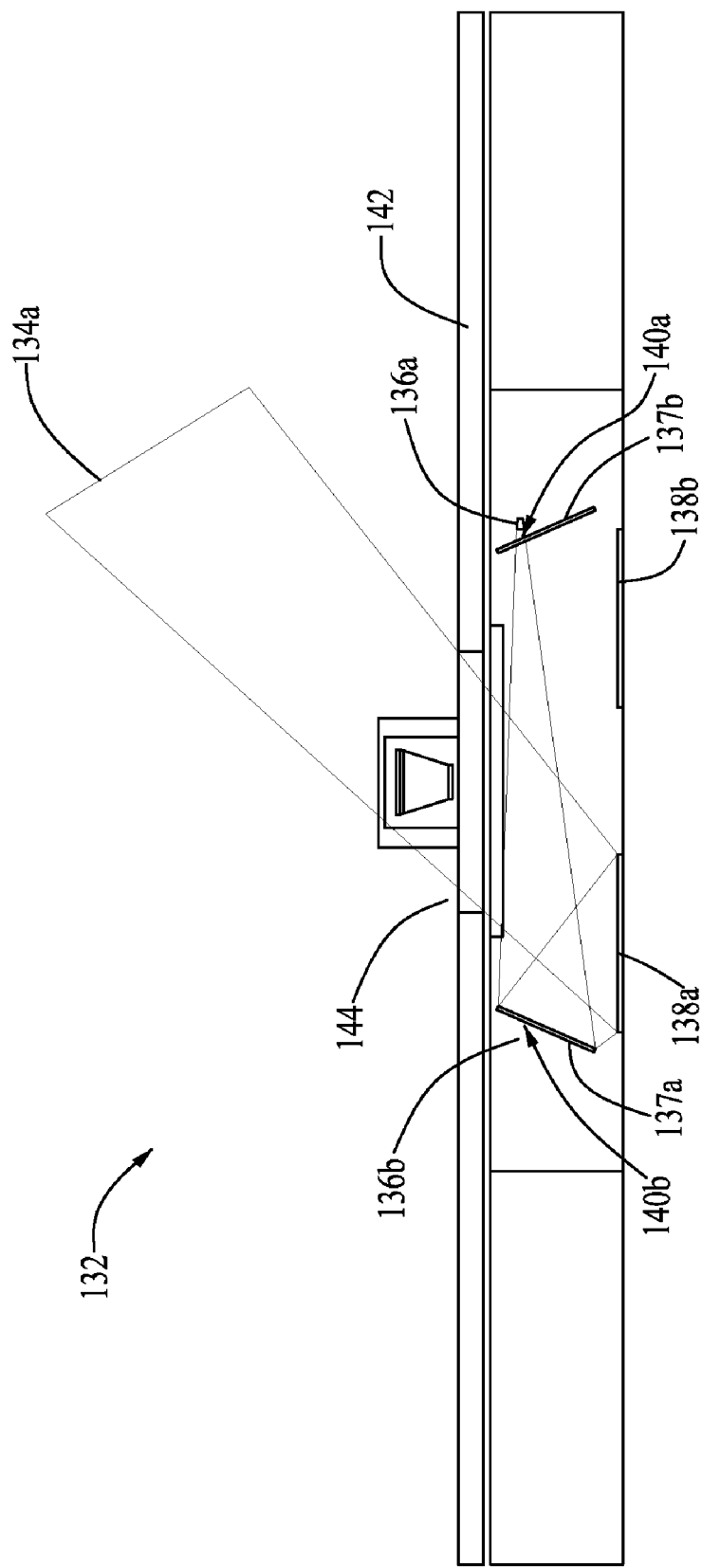

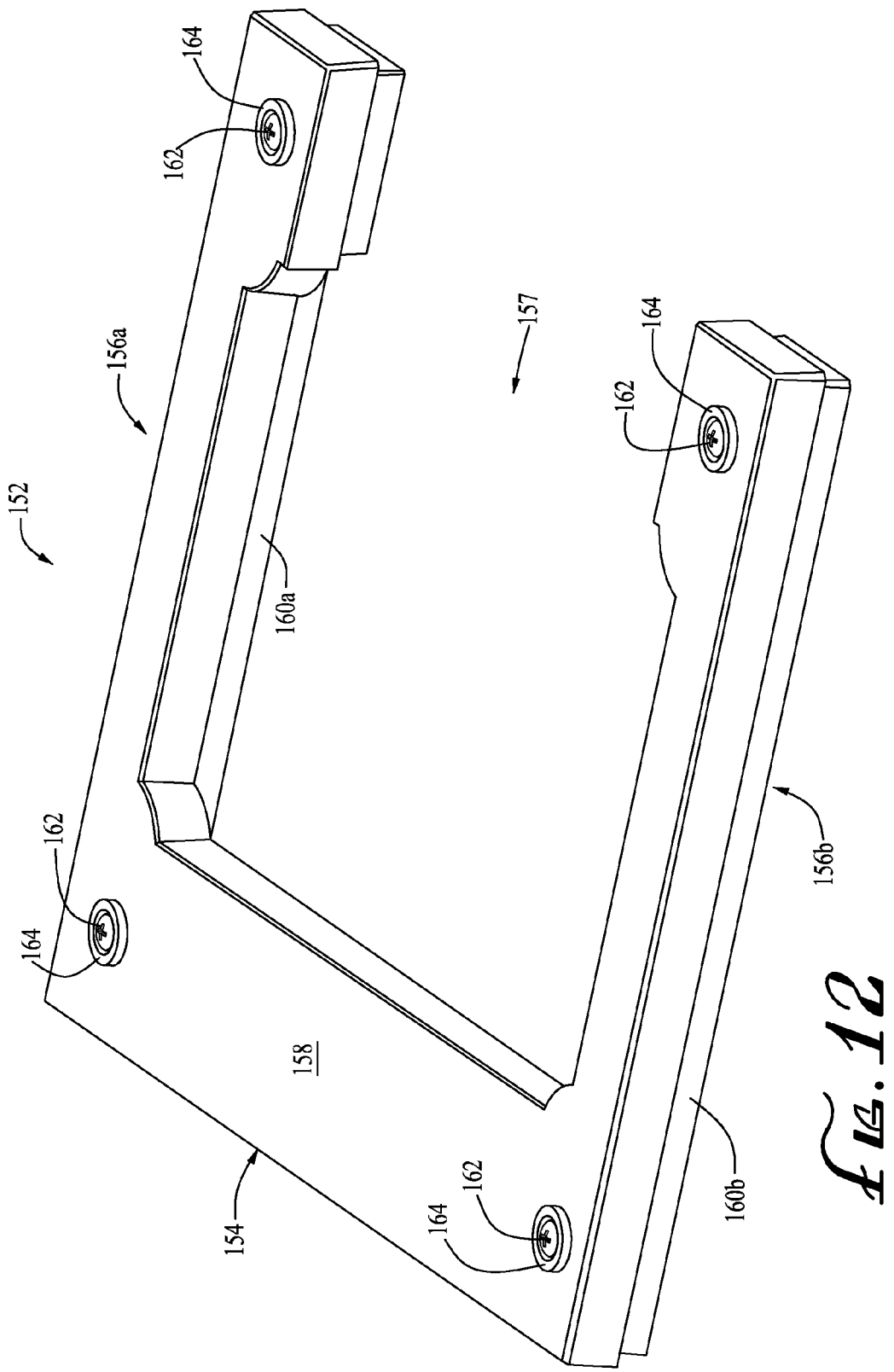

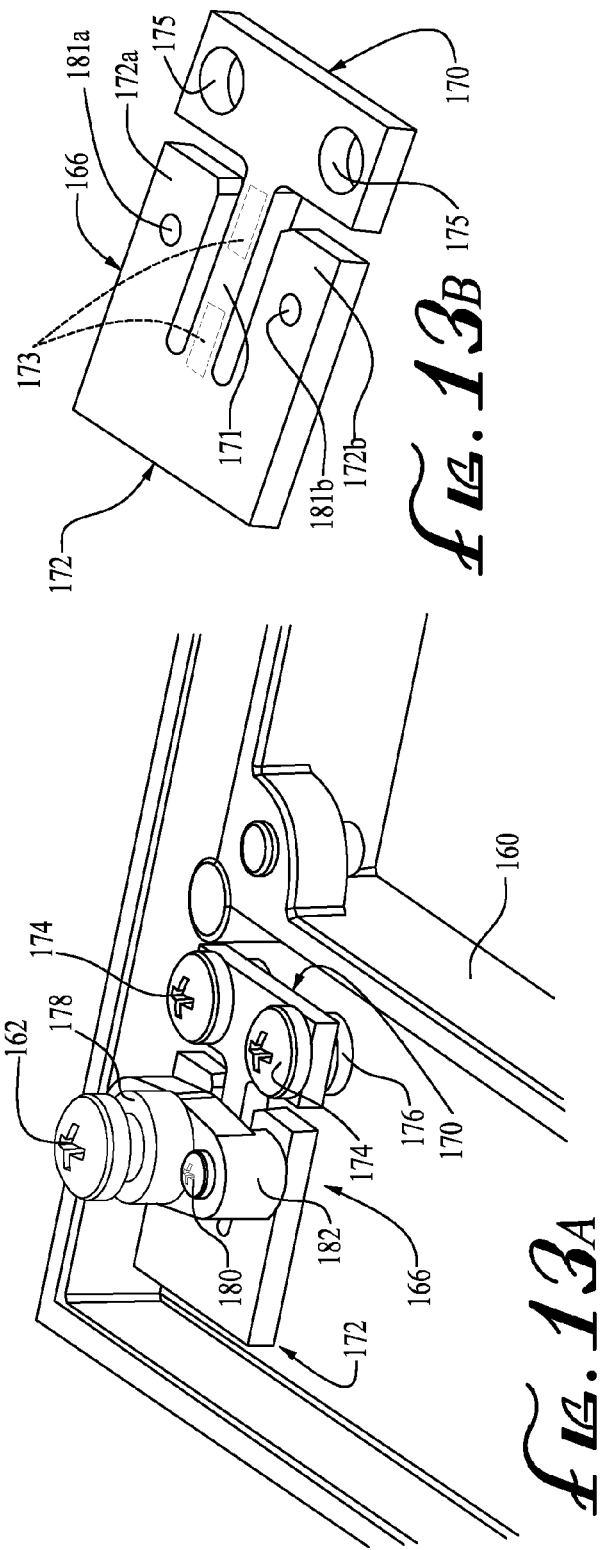
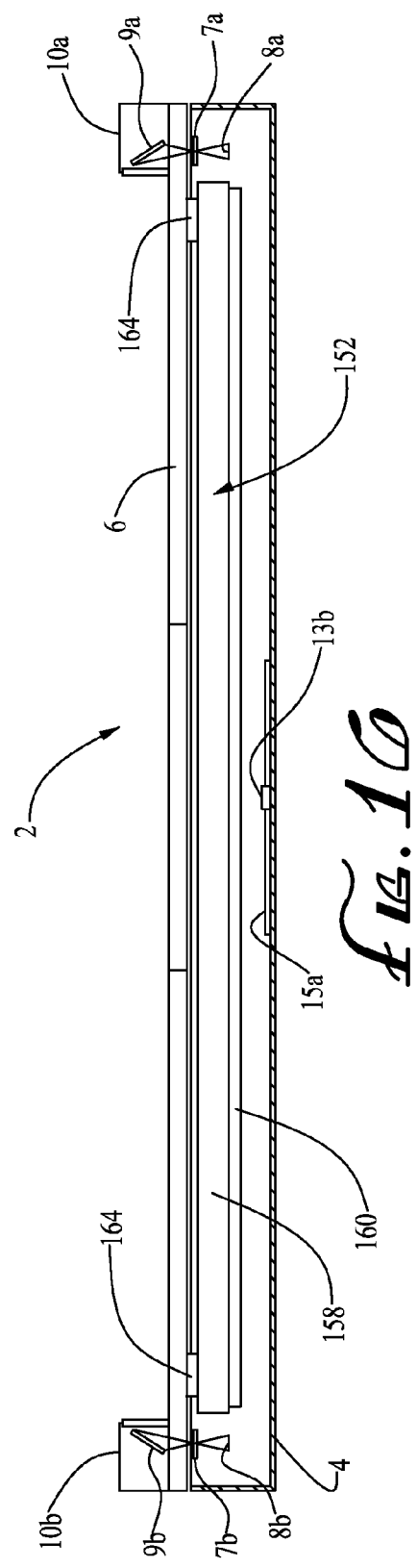

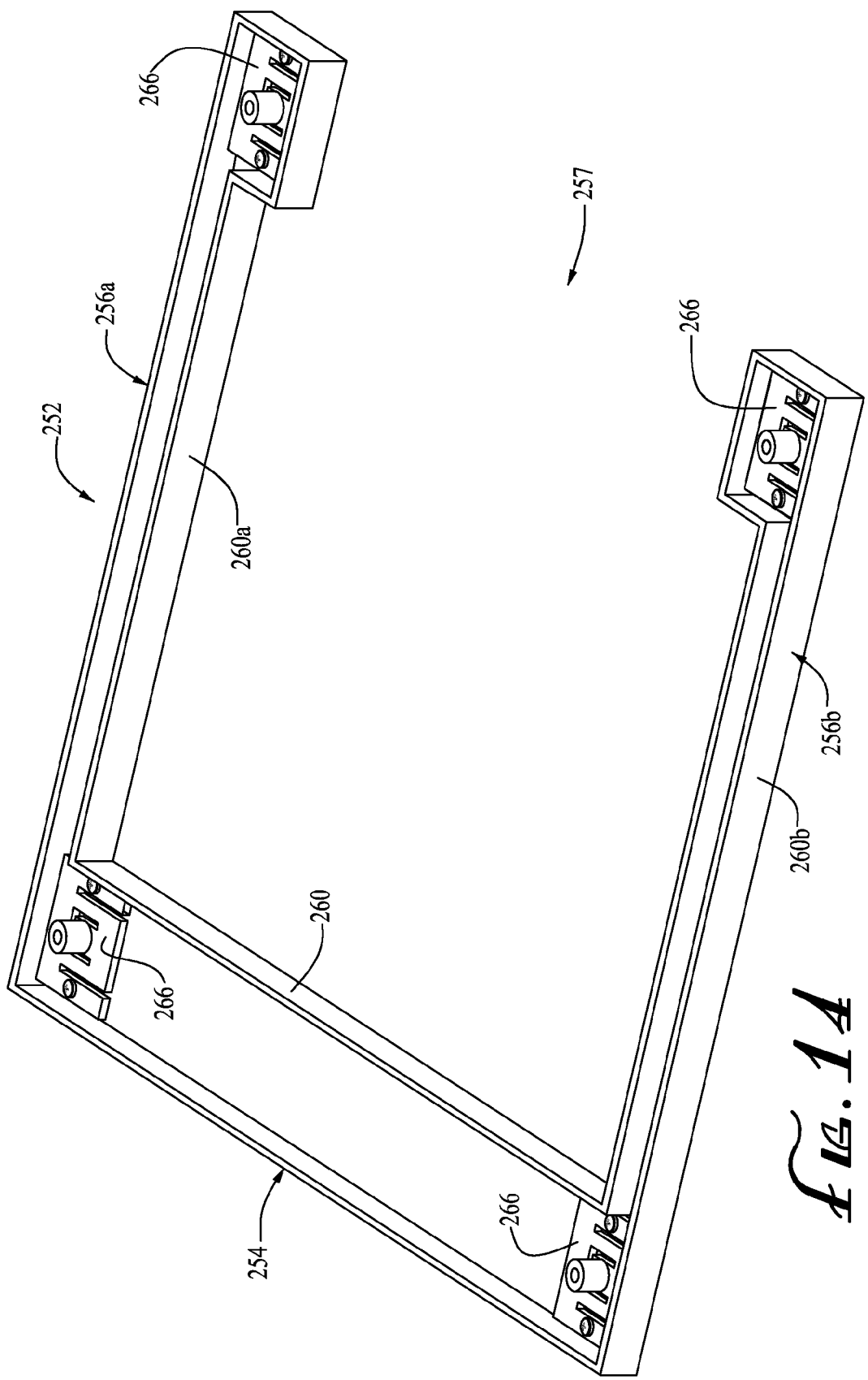

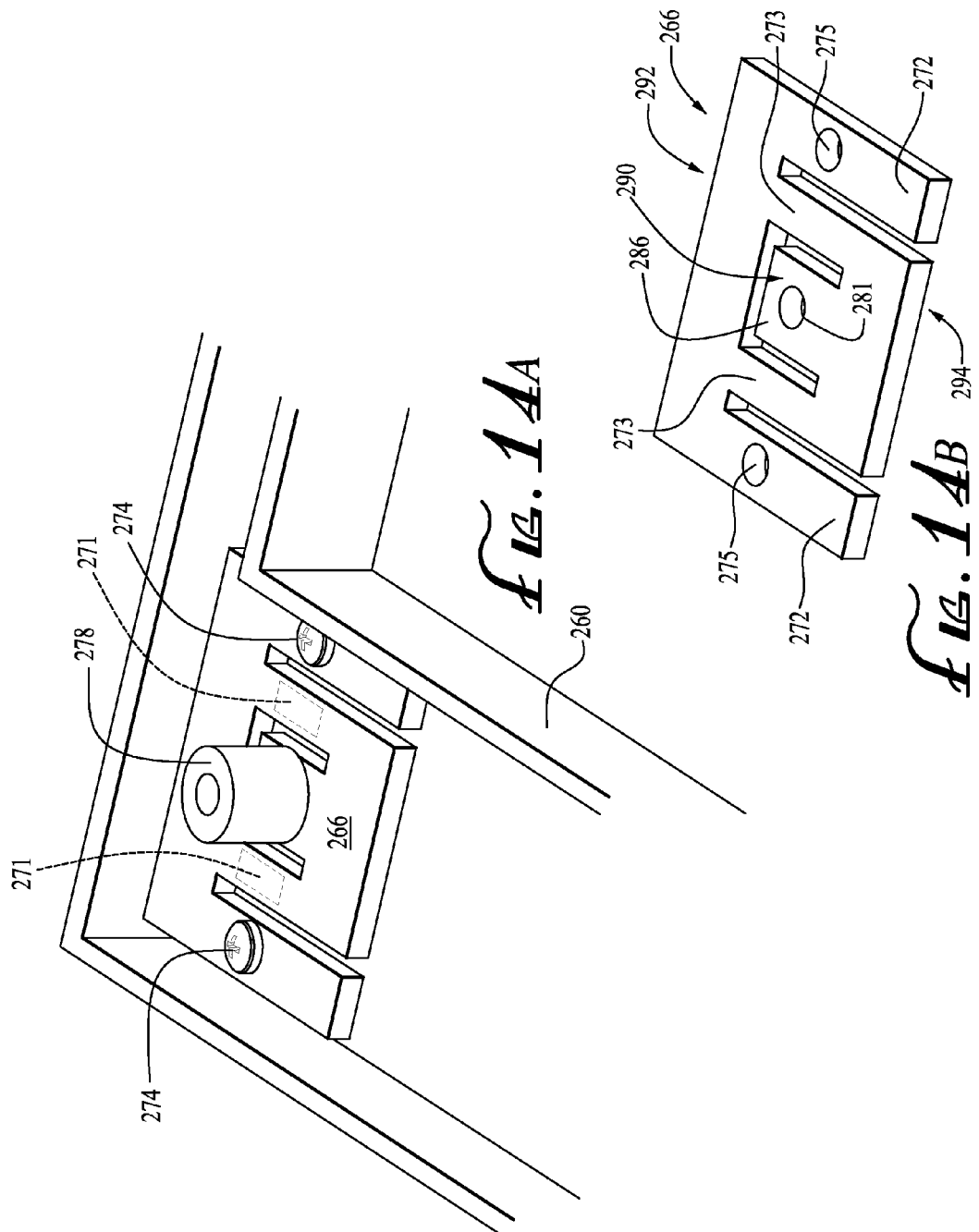

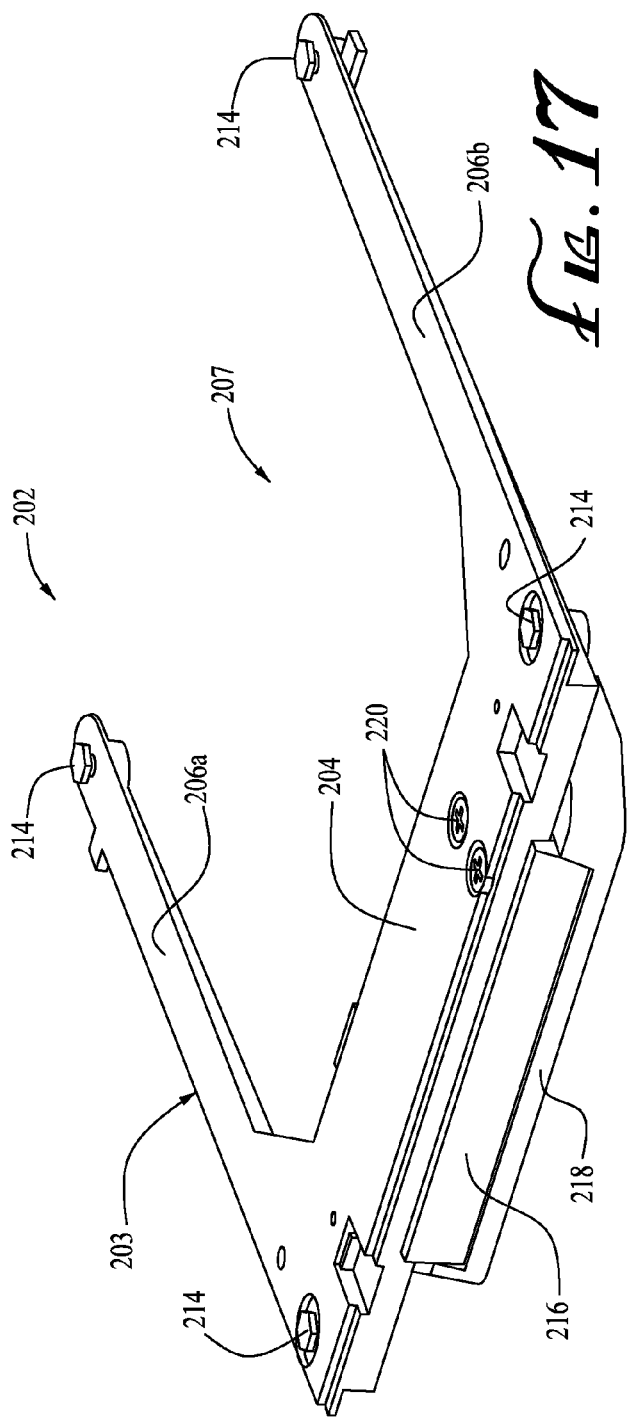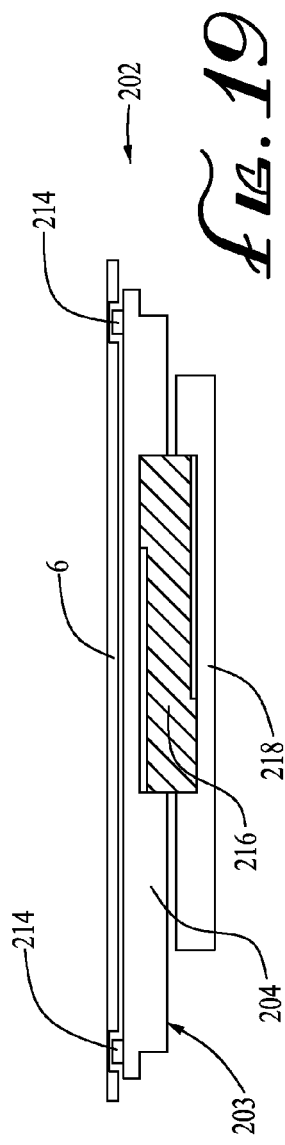

IMAGING SCANNER-SCALE WITH LOW VERTICAL PROFILE

RELATED APPLICATION DATA

This application claims the benefit under 35 U.S.C. §119 (e) of U.S. Provisional Patent Application No. 61/175,849, filed May 6, 2009, and titled "Imaging Scanner-Scale With Low Vertical Profile," hereby incorporated by reference.

BACKGROUND

The field of the present disclosure relates generally to optical code reading systems, such as for example barcode scanners. More particularly, this disclosure relates to systems, methods, and apparatus relating to an integrated scale and optical code reading system.

A checkout lane at a grocery store or other retail point of sale (POS) can be a demanding, high-pressure environment. A store employee manning and/or operating a check stand (i.e., a checker) can be expected to provide exceptional customer service, which may include quickly totaling each customer's purchase and collecting payment. Rapidly processing customer purchases reduces the time other customers must wait to make their purchases. When a store is busy and checkout lines are long, checkers can experience increased pressure to rapidly process customer purchases. A customer using a "self-checkout" check stand (i.e., a customer-checker) can feel similarly pressured to expeditiously process their purchases in a timely manner.

One method for improving the speed and efficiency of a checker is to provide an optical reader to allow the checker to quickly scan items. Although optical reading of data, or encoded optical symbols or optical codes such as barcode labels, is used in a variety of applications, a check stand of a grocery store checkout lane or similar retail POS context is a familiar application. As an optical code is passed through a scan volume (or scanning area), the optical code is read by an optical code reader, such as a scanner, and transformed into electrical signals. The electrical signals can be decoded into alphanumerical characters or other data that can be used as input to a data processing system, such as a POS terminal (e.g., an electronic cash register). The POS terminal can use the decoded data to, for example, look up a price for the article, apply electronic coupons, and award points for a retailer or other rewards program. Scanning an optical code on items enables rapid totaling of the price of such items and thereby increases checker efficiency.

In a typical process, a checker passes the item through the scan volume to allow the scanner to scan a barcode on the item. An item can have multiple sides, not all of which might be presented for scanning, depending on the shape of the item and the type of scanner. For example, a simple six-sided rectangular box-shaped item can have a leading side (or side leading the item through the scan volume), a trailing side (opposite the leading side and last through the scan volume), a bottom side, a top side, a front side positioned nearest to or facing the checker (also known as the checker side), and a back side positioned away from the checker (also known as the customer side). Some horizontal scanners (i.e., scanners with a single upwardly-facing horizontal window) can effectively scan only the bottom side. Accordingly, a checker operating such a scanner would be required to re-orient an item to be scanned such that the side of the item with the barcode is positioned as the bottom side. Re-orienting an item takes time and reduces efficiency. Moreover, the movements required for a checker to re-orient an item can potentially injure the checker when the movements are repeated many times during the course of a shift. A scanner that can scan multiple sides of an item is desirable to reduce or even eliminate the need to re-orient items to be scanned.

Some scanners are capable of scanning multiple sides of an item by utilizing a bioptic configuration. A bioptic configuration includes two scanner windows for reading an optical code. Examples of scanners utilizing a bioptic configuration are the Magellan® 8300, 8400, and 8500 scanners available from Datalogic Scanning, Inc. of Eugene, Oreg. Further description of bioptic scanners may be found in U.S. Pat. No. 7,198,195, which is hereby incorporated by reference. In an "L" shaped bioptic scanner, in addition to a horizontal bottom scanner window that is generally positioned at counter level, a vertical scanner window is positioned to scan one or more sides of an item.

By scanning the bottom of an item and one or more other sides of the item, the bioptic configuration can increase the probability of a successful first scan (i.e. improve the first pass read rate) and reduce time consuming product manipulations and repeat scans. However, the present inventors have recognized that the "L" shaped bioptic configuration has its own limitations. For example, the vertical scanner window is positioned in a vertical section of the scanner, which can occupy significant space at the check stand and/or in the checkout lane. Furthermore, if the check stand includes a conveyor belt, the positioning of the vertical section can necessitate a diverter to divert items on the conveyor belt away from the vertical section. Finally, positioning of the vertical section may limit where a POS terminal keyboard, display, and check-writing stand can be located. Accordingly, the present inventors have recognized the desirability of a scanner that can scan multiple sides of an item, without utilizing a vertical scanner window.

In addition to a scanner, a POS system such as a grocery store check stand often includes a scale for conveniently and efficiently weighing items such as produce. The weight information can be used as input to the POS system, similar to the decoded optical code. The POS system can use the weight information to determine a price for the article weighed, for example. The scale can be integrated with the scanner to provide a single unit that can be referred to as a scanner-scale.

Existing scanner-scales are bulky and extend from a depth of four inches to nearly seven inches below the counter. The size, and in particular the depth, of scanner-scales is largely due to the optical elements utilized to provide a bottom scanner component that can effectively read an optical code. Many existing scanner-scales comprise laser diode scanning technology, which typically employs a spinning facet wheel or mirror and one or more pattern mirrors to break the laser beam into various scan lines forming the scan pattern. These components occupy significant space, thereby contributing to the bulkiness of existing scanner-scales. The depth of existing scanner-scales prevents ergonomic placement of a cash drawer directly below the scanner-scale at a check stand.

The present inventors have determined that it would be desirable to provide a scanner-scale having a low vertical profile under which a cash drawer could be placed at a check stand. In addition, the inventors have determined it would be desirable to provide a scanner that, without a vertical scanner window, can scan multiple sides of an item.

SUMMARY

The present disclosure is generally directed to systems and methods of optical imaging particularly in relation to scanner-scales having a low vertical profile. Various aspects of the present disclosure, including but not limited to employing imaging technology, employing planar beam scale technology, and positioning and configuring imagers, lenses, and/or mirrors, can provide a scanner-scale that is sufficiently thin in the vertical direction (i.e., low vertical profile) to allow a cash drawer to be positioned directly below the scanner-scale at a check stand. The ability to position a cash drawer beneath the scanner-scale can provide, in certain preferred embodiments, ergonomic and space saving benefits. Moreover, various aspects of the present disclosure can enable eliminating a vertical scanner window and/or vertical section of the scanner from the scanner-scale, while still allowing the scanner-scale to scan multiple sides of an item. A thin profile scanner-scale without a vertical section may enable greater flexibility in the positioning of various components of a check stand, including but not limited to a conveyor belt, POS terminal, keyboard, display, and check-writing stand, to provide a more ergonomic and space saving arrangement, among other benefits.

BRIEF DESCRIPTION OF THE DRAWINGS

Understanding that drawings depict only certain preferred embodiments and are not therefore to be considered to be limiting in nature, non-limiting and non-exhaustive embodiments of the disclosure are described and explained with additional specificity and detail through the use of the accompanying drawings, in which:

FIG. 2A is a close-up side view of an alternate embodiment of an imaging scanner scale including an optical prism.

FIG. 9 is a side view of still another embodiment of an imaging scanner-scale, depicting an FOV of a bottom imager.

FIG. 11 is a side view of still another embodiment of an imaging scanner-scale, depicting an FOV of a bottom imager.

FIG. 12 is a perspective view of a planar beam scale of an imaging scanner-scale, according to one embodiment.

FIG. 13A is a close-up perspective view of a load cell of a planar beam scale of an imaging scanner-scale, the load cell secured to the beams of the planar beam scale according to one embodiment.

FIG. 13B is a perspective view of a load cell of a planar beam scale, according to one embodiment.

FIG. 14 is a perspective view of a planar beam scale, without a top cover and having another type load cells, according to one embodiment of the present disclosure.

FIG. 14A is a close-up perspective view of the planar beam scale of FIG. 14 showing the load cell of FIG. 14B secured to the beams of the planar beam scale according to one embodiment.

FIG. 14B is a perspective view of a load cell of FIG. 14, according to one embodiment.

FIG. 16 is a cross-sectional side view of an imaging scanner-scale, according to one embodiment.

FIG. 17 is a perspective view of a bending beam scale of an imaging scanner-scale, according to one embodiment.

FIG. 19 is a front side view of the bending beam scale of FIG. 16.

DETAILED DESCRIPTION

Figure 1:
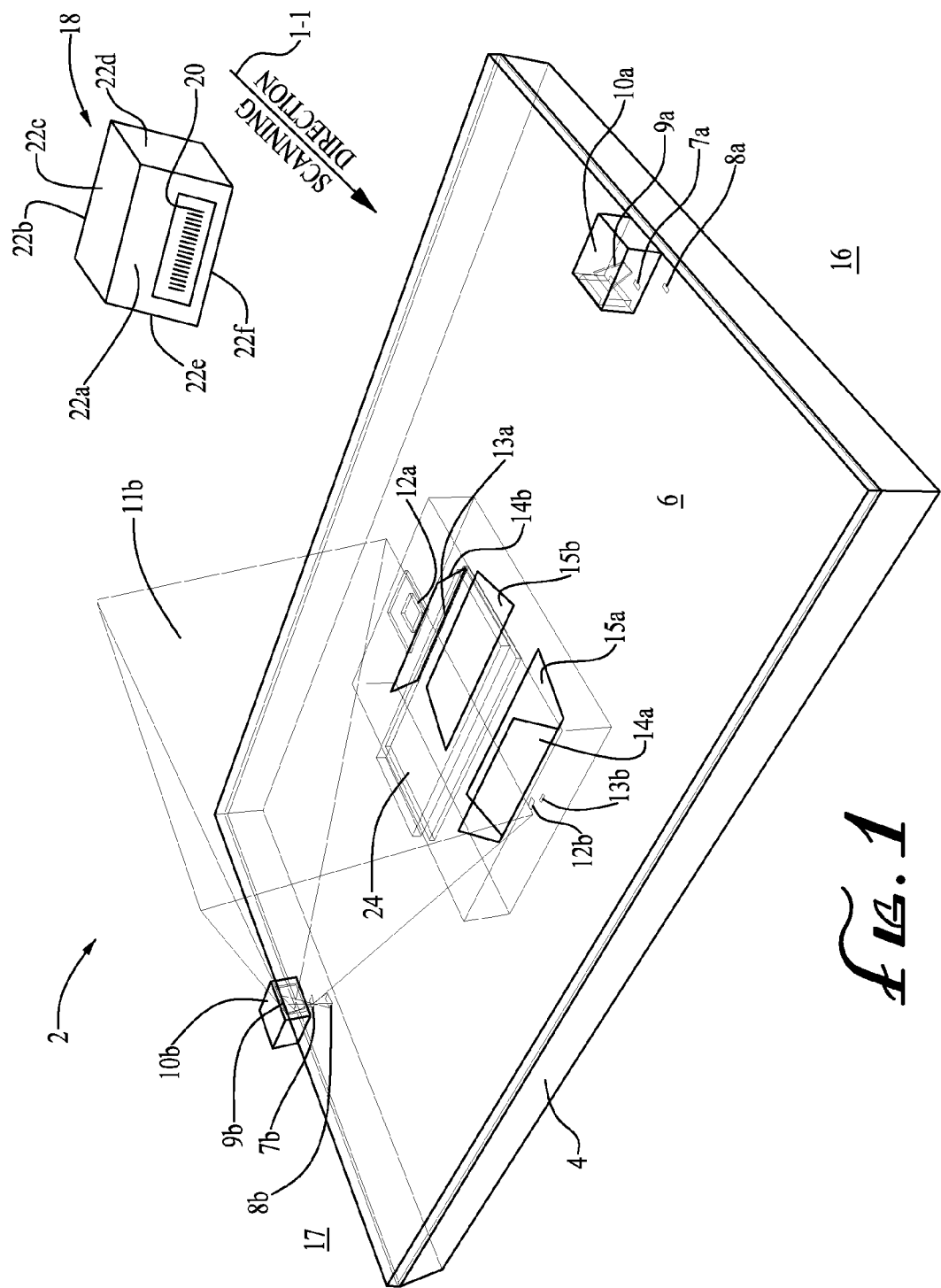
FIG. 1 is a perspective view of an imaging scanner-scale, according to one embodiment, depicting a field of view (FOV) of a side imager.

A scanner-scale at a grocery store check stand or other retail point of sale (POS) enables a checker to rapidly total a customer's purchases. The checker passes an item to be purchased through a scan volume. An optical code such as a barcode is generally affixed to the item or the packaging of the item. If the barcode is successfully read by the scanner, the barcode is transformed into electrical signals that can be decoded into alphanumerical characters or other data. The alphanumerical characters or other data can be used as input to a data processing system, such as a POS terminal (e.g., an electronic cash register). The POS terminal uses the data to determine the price for the article, apply electronic coupons, award points for a retailer or other rewards program, etc. If the barcode is not successfully read, the checker must rescan the item or enter the information of the item to be purchased into the POS terminal by hand to add the price of the item to the total purchase.

Although various factors can lead to an unsuccessful scan, an important factor when using some scanners is the orientation of the item. Some scanners can effectively scan only one side of an item. Accordingly, a checker operating such a scanner may re-orient an item to be scanned so that the side of the item with the barcode is positioned facing a scanner window of the scanner. Re-orienting an item takes time and thereby reduces the efficiency of the checker. Moreover, the movements required for a checker to re-orient an item, when repeated many times during the course of a shift, can potentially injure the checker. A scanner that can scan multiple sides of an item, reducing or even eliminating the need to re-orient items to be scanned, is desirable.

While scanning multiple sides can be accomplished by a bioptic scanner having a horizontal scanner window and a vertical scanner window, a scanner-scale that is without a vertical window and that is capable of scanning multiple sides can provide additional advantages. The vertical portion of a scanner that houses a vertical scanner window can occupy significant space at the check stand. Because a scanner-scale may be a critical component due to the frequency of use, positioning of the scanner-scale can take precedence over positioning of other check stand components. The size and space requirements of a scanner-scale with a vertical window can thereby limit ergonomically positioning other check stand components. Accordingly, a scanner-scale that can scan multiple sides of an item, without utilizing a vertical window, may allow greater flexibility in the positioning of various components of a check stand, including but not limited to a conveyor belt, POS terminal, keyboard, display, and check-writing stand, and thus provide a more ergonomic and space-saving arrangement.

Factors other than the rate of successful scans are also important to overall employee efficiency and cost-efficiency of a check stand. Ergonomic and space considerations can affect employee efficiency and satisfaction and the cost to install a check stand. The position of elements of the check stand, including but not limited to the cash drawer, the POS terminal, and a conveyor belt, can significantly impact checker efficiency. The position of these elements can also affect checker health and well-being by reducing risks of injury caused by, for example, lifting, prolonged standing, and repetitive motion. A cash drawer positioned directly below the scanner-scale at a check stand that allows a checker to be seated at the check stand may provide ergonomic benefits.

One preferred configuration described herein is an imaging scanner-scale having a low vertical profile, such that a cash drawer can be ergonomically positioned below the scanner-scale in a check stand, the scanner-scale preferably being capable of scanning multiple sides of an item, without utilizing a vertical scanner window.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

FIG. 1 is a perspective view of an imaging scanner-scale 2, according to a preferred embodiment. The imaging scanner-scale 2 comprises a frame 4, a weigh platter 6, one or more side imagers 8*a/b*, one or more side imager lenses 7*a/b*, one or more side imaging mirrors 9*a/b* to direct a field of view (FOV) 11*b* of the side imagers 8*a/b* (only FOV 11*b* is shown, but it should be appreciated that the side imager 8*a* will also have an FOV 11*a* that is generally similar to FOV 11*b*), one or more side imager housings 10*a/b*, one or more bottom imagers 12*a/b*, a plurality of mirrors 13*a/b*, 14 *a/b*, 15 *a/b* to direct an FOV of one or more of the bottom imagers 12 *a/b*, and a planar beam scale (described below with reference to FIGS. 12-15). The scanner-scale 2 may be described as being oriented to have a checker side 16, positioned closest to an operator of the check stand (i.e., checker), and a customer side 17, positioned opposite the checker side 16, away from the checker and closest to the customers. The orientation of the scanner-scale 2 relative to customers and the products to be purchased, space constraints at a check stand, and ergonomic considerations all imply a general direction of movement of an item through the scan volume, which may be called the "item direction" or "scanning direction." From the perspective of the checker, the scanning direction is shown as right-to-left, as indicated in FIG. 1 by an arrow 1-1. The scanning direction 1-1 is substantially parallel to the checker side 16 and the customer side 17 of the scanner-scale 2.

Although the scanning direction is indicated as right-to-left by arrow 1-1, the scanner-scale 2 may also allow scanning in the opposite direction, left-to-right from the perspective of the checker. In fact, the scanner-scale 2 is capable of scanning an item 18 that is presented from any direction, or that is held stationary while substantially within the scan volume. Although capable of scanning an item 18 presented from any direction, the scanner-scale will ordinarily be configured for one scanning direction and a checker will typically pass an item 18 through the scan volume in the scanning direction 1-1.

An item 18 to be scanned typically includes an optical code such as a barcode 20. The barcode 20 comprises bars and spaces that alternate and vary in thickness in a manner that encodes information. The barcode 20 can be printed on a label, printed on the item 18, printed on the packaging of the item 18, or otherwise affixed to the item 18. The checker passes the item 18 over the scanner-scale 2 to scan the barcode 20 of the item 18. As depicted in FIG. 1, an item 18 can have various sides 22. For example, the item 18 of FIG. 1 is a six-sided rectangular box-shaped object. A box-shaped item 18 has a leading side 22*a*, a trailing side 22*b*, a top side 22*c*, a front side 22*d* nearest to the checker, a back side 22*e* closest to the customer, and a bottom side 22*f* nearest to the weigh platter 6. Hereinafter, these various sides of a box-shaped item 18 may be referred to generally as sides 22. The leading side 22*a*, the trailing side 22*b*, the front side 22*d*, and the back side 22*e* may also be referred to as lateral sides 22*a/b/d/e*, as distinguishable from the top side 22*c* and the bottom side 22*f*. The barcode 20 of item 18 is depicted on the leading side 22*a*. However, as can be appreciated, the relative position of a barcode 20 can vary, and the barcode 20 can be positioned on any of the sides 22 of the item 18.

Figure 2:
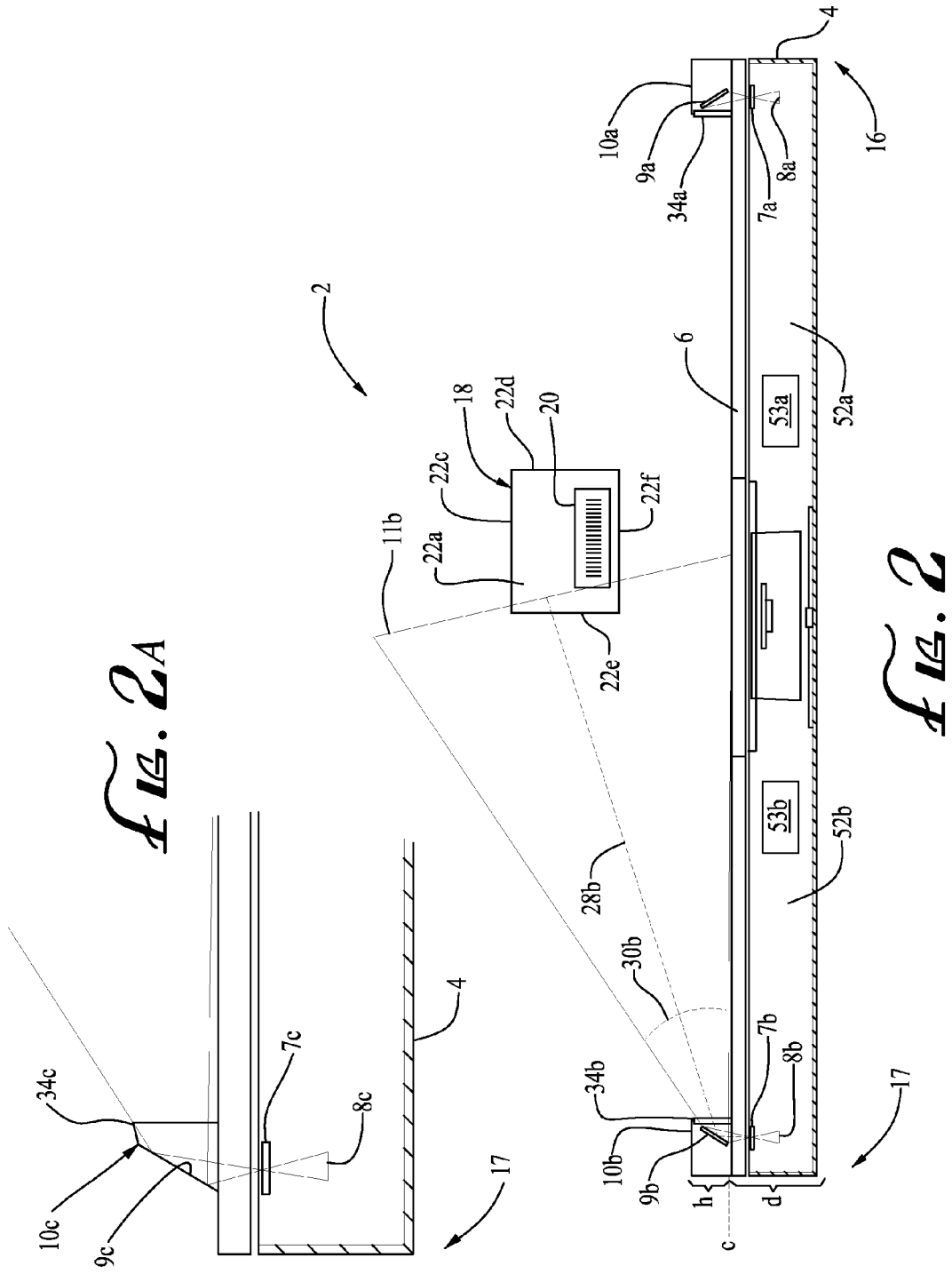
FIG. 2 is a side view of the imaging scanner-scale of FIG. 1, depicting an FOV of a side imager.
Figure 4:
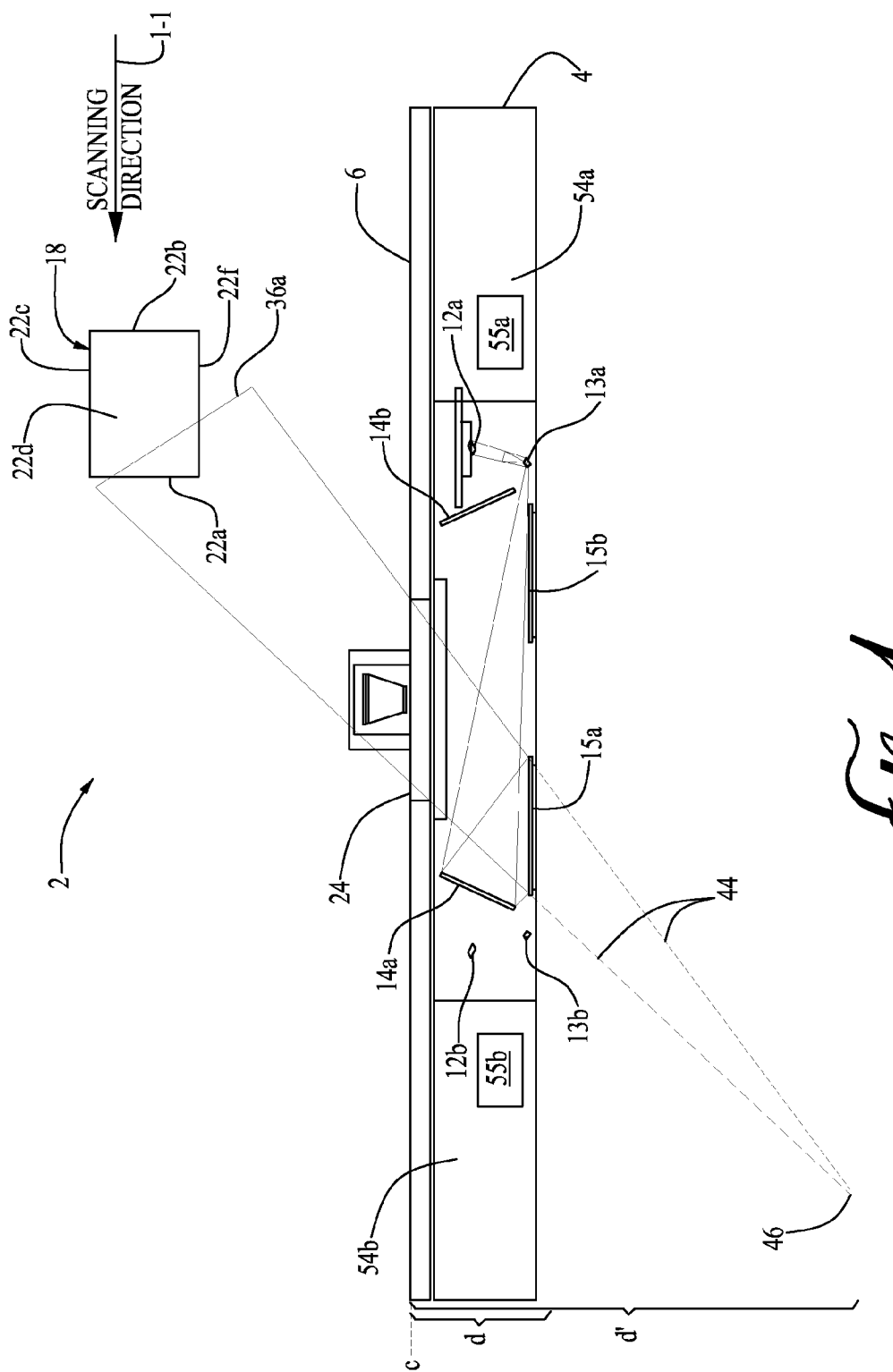
FIG. 4 is a side view of the thin imaging scanner-scale of FIG. 1, depicting an FOV of a bottom imager.
Figure 15:
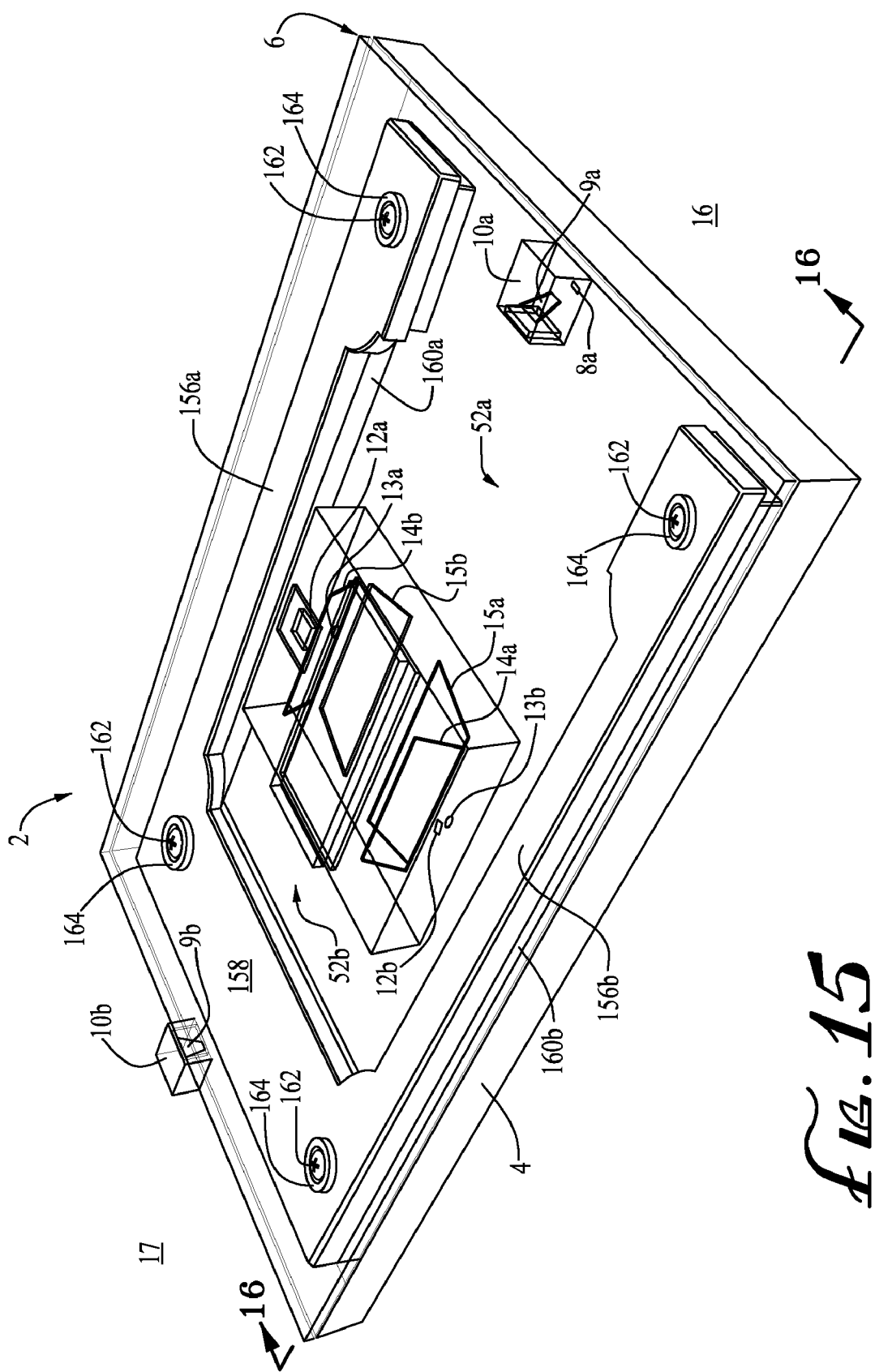
FIG. 15 is a perspective view of an imaging scanner-scale having a scanner, a scale, and POS electronics integrated therein, according to one embodiment.

The frame 4 provides a structure for the scanner-scale and supports the weigh platter 6. The frame 4 in the embodiment of FIG. 1 substantially defines the dimensions and shape of the scanner-scale 2, establishing the rectangular shape of the scanner-scale 2. The frame 4 also at least partially encloses the bottom imagers 12*a/b* and bottom imaging mirrors 13*a/b*, 14 *a/b*, 15 *a/b* to protect these components. The frame 4 comprises side rails that define an interior space. The side rails provide shape and depth to enclose the bottom imaging components. The frame 4 can also enclose the planar beam scale, as shown in FIGS. 14 and 15 and discussed in greater detail below with reference to the same. The frame 4 can also comprise a bottom (not visible in the view of FIG. 1, but shown in FIG. 2) to further enclose any bottom imaging components and the planar beam scale. Electronics of the scanner and/or a POS terminal can also be supported and/or housed within the frame 4, as shown in FIGS. 2 and 4 and described below with reference to the same. The shape and structure of the frame 4 allow the frame 4 to secure and/or support the planar beam scale. The frame 4 secures and/or supports the planar beam scale in a position that allows the weigh platter 6 to also be coupled to and/or secured to the planar beam scale. In the embodiment of FIG. 1, the weigh platter 6 is not secured to the frame 4, so as to allow movement of the weigh platter 6 relative to the frame 4 when an item 18 is weighed. The position of the planar beam scale relative to the frame 4 and the weigh platter 6 is discussed in greater detail below with reference to FIGS. 14 and 15.

With continued reference to FIG. 1, the weigh platter 6 provides a surface upon which an item 18 can be placed for weighing, as well as a reference plane for scanning an item 18. The weigh platter 6 rests on top of and/or is secured to a planar beam scale positioned within the frame 4, as described more fully below with reference to FIGS. 15 and 16. The platter, and any components secured to or positioned above the weigh platter 6 are weighed by the planar beam scale. Accordingly, when an item 18 is placed on top of the weigh platter 6, the weight of the item 18 exerts a force on the weigh platter 6, which is in turn transferred to the planar beam scale. In this manner, an item 18 placed on the weigh platter 6 can be weighed. The weigh platter 6 preferably includes a window 24 through which the bottom imagers 12a/b can scan an item 18. The window 24 is preferably made of sapphire glass or other scratch resistant material to limit scratching and other damage to the window when an item 18 is dragged across the window. The weigh platter 6, in conjunction with the frame 4, further encloses any bottom imaging components and/or any scanner-scale electronics or POS electronics.

A customer side imager 8b is positioned substantially at the customer side 17 of the weigh platter 6. The customer side imager 8b is configured such that the FOV 11b of the imager is directed toward the checker side 16. FIG. 1 illustrates an outline of an FOV 11b of the customer side imager 8b. The FOV 11b is somewhat narrow near the edge of the weigh platter 6 and gradually expands outwardly as it extends toward the checker side 16, as shown in FIG. 1. A checker side imager 8a is positioned substantially at the edge of the weigh platter 6 on the checker side 16. The checker side imager 8a is configured such that the FOV (not depicted) of the imager extends from the checker side 16 substantially toward the customer side 17. The FOV of the checker side imager 8a is not depicted, but is similar to the FOV 11b of the customer side imager 8b and extends in an opposite direction.

The FOV of an imager, such as the side imagers 8a/b and the bottom imagers 12a/b, is defined by a combination of line of sight and angle of view of the imager. The FOV of an imager encompasses all that is visible through the imager at a particular position and orientation in space. An imager may have different angles of view in different directions, or it may be symmetric. For example, an imager having a uniform angle of view in all directions will have a circular FOV, centered about the line of sight. More traditionally, an imager's angle of view in the horizontal direction is different than the imager's angle of view in the vertical direction, resulting in a rectangular FOV, centered about the line of sight. The line of sight and the angle of view are defined by the size of the imaging area of the imager, the location and focal length of the lens, and the relative positions of the optical axis of the imager and the lens. A wide angle of view allows for a more expansive FOV than does a narrow angle of view. However, the depth of field of such a system is typically shorter than a system with a narrow angle of view, due to the resolution limitations of the imager. The depth of field is also affected by the lens characteristics (such as f-number), imager sensitivity, and illumination.

Although the extent of the FOV 11b is portrayed in FIG. 1 as a definite volume, it will be appreciated that the extent of the FOV 11b and its relative positioning above the weigh platter 6 can be adjusted using lenses, mirrors, apertures, and other optical components. Moreover, it will also be appreciated that the depth of field within the FOV 11b can be similarly adjusted. The depth of field is the range over the FOV that is reasonably focused to capture an image with sufficient resolution to read an optical code. If the optical code is a barcode, the resolution of the image is sufficient when the thinnest bar of the barcode can be distinguished from the thinnest space of the barcode.

Figure 5:
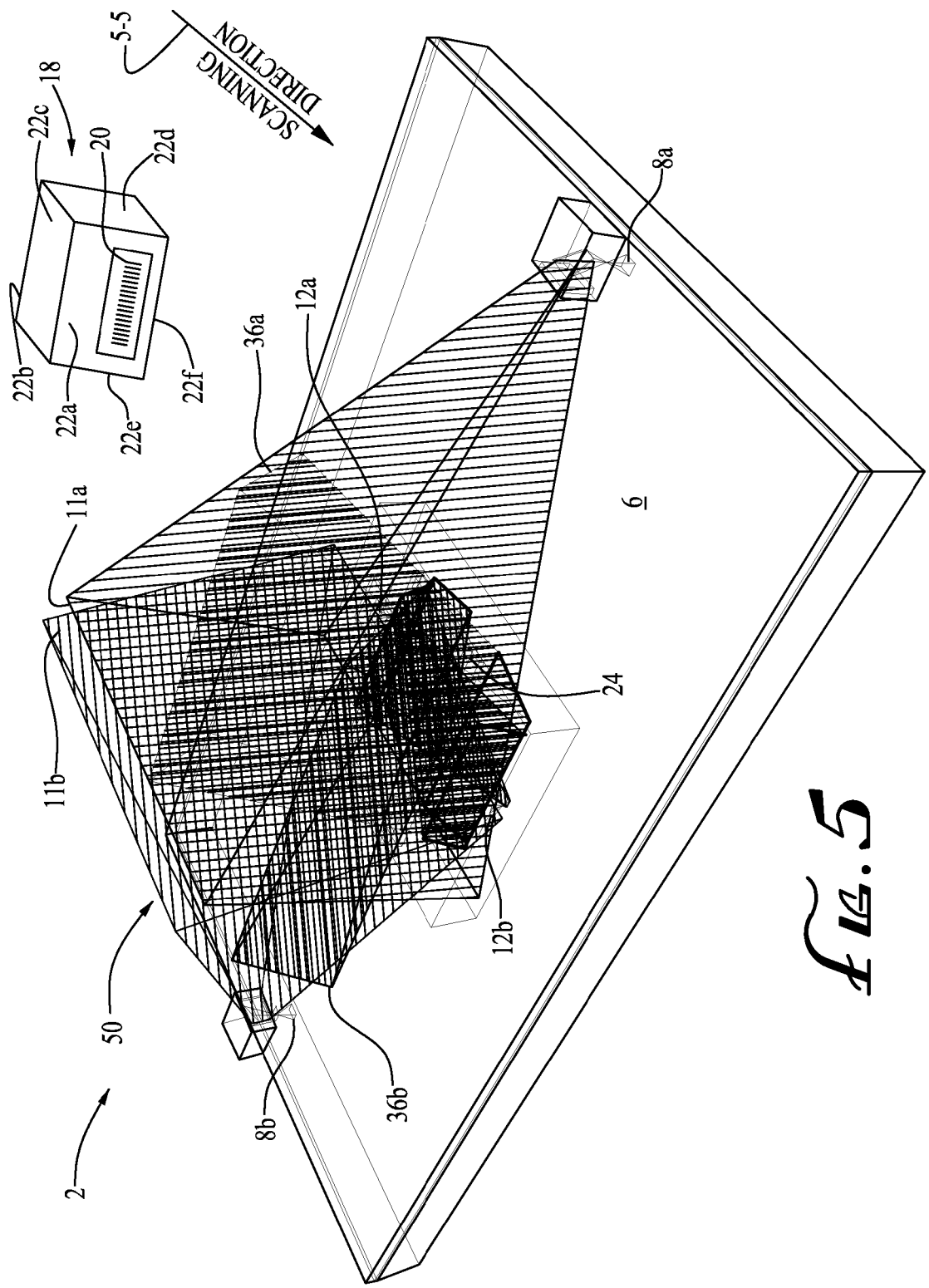
FIG. 5 is a perspective view of the imaging scanner-scale of FIG. 1, depicting the scan volume formed by the FOVs of all imagers.
Figure 6:
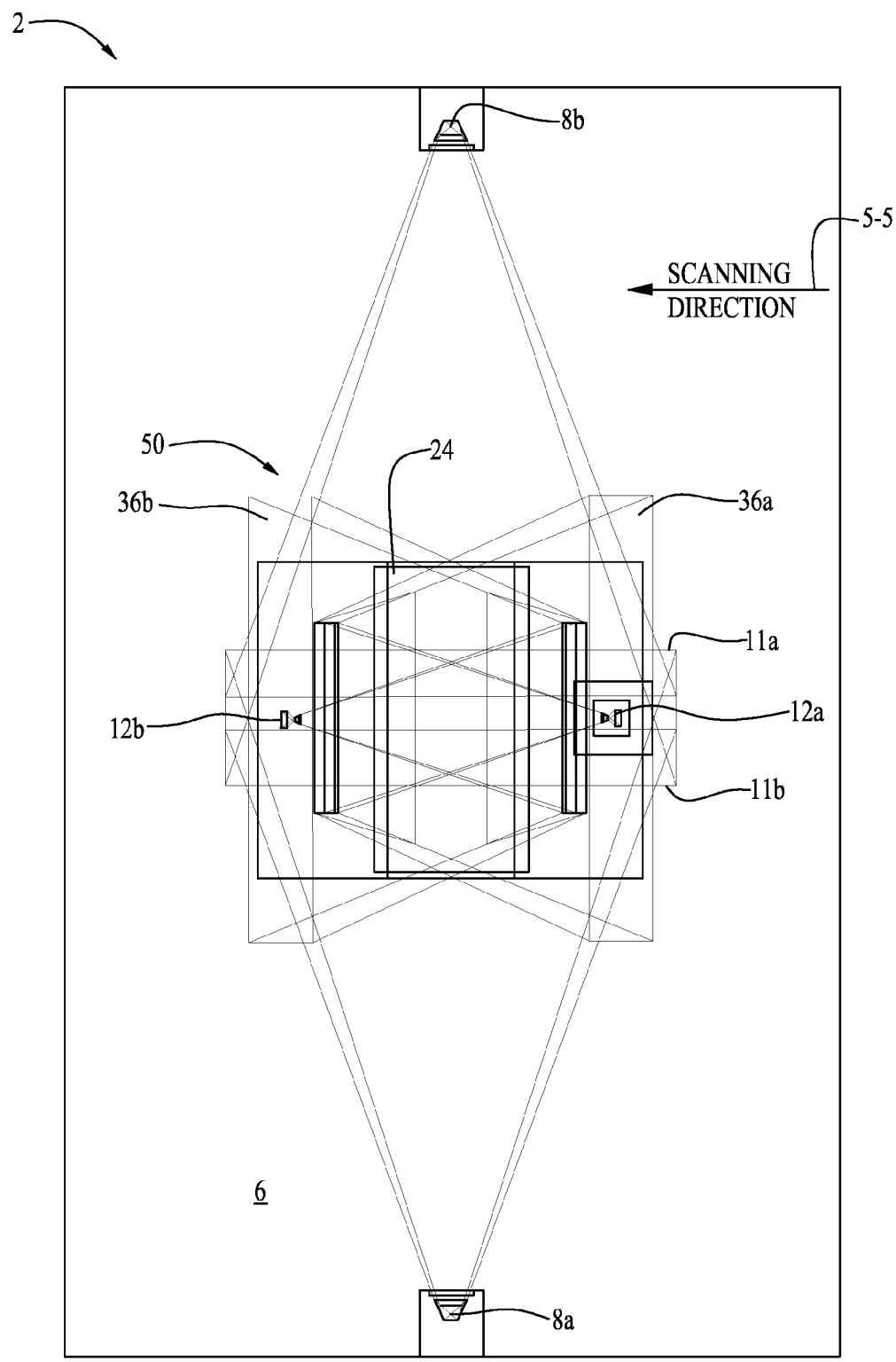
FIG. 6 is a top view of the imaging scanner-scale of FIG. 1, depicting the scan volume.

At least a portion of the FOV 11b partially defines a scan volume, as shown in FIGS. 5 and 6 and described below with reference to the same. The scan volume is a space in which optimal scanning of an item 18 can occur. The depth of field of the FOV 11b can be adjusted to comprise the portion of the scan volume defined by the FOV 11b. As an operator passes the item 18 over the weigh platter 6 to scan the item 18, the item 18 may pass through the scan volume, including the portion of the scan volume defined by the FOV 11b of the side imager 8b. The side imager 8b captures an image of the back side 22e of the item 18, attempting to read a barcode 20 positioned thereon. The captured image encompasses all that is within the FOV 11b of the side imager 8b. Objects within the depth of field are substantially in focus, such that the resolution of the image is sufficient to be able to identify and read a barcode 20. Passing the item 18 through the scan volume provides a higher probability that a barcode 20 on the item 18 will be successfully scanned, as discussed in greater detail below with reference to FIG. 5. The probability of a successful scan is higher because the FOVs of multiple imagers are directed to the item 18. The multiple imagers can capture images of multiple sides 22 of the item 18 to read a barcode 20 positioned on any of those sides 22.

In FIG. 1, a barcode 20 may be present on the leading side 22a, as shown, rather than on the back side 22e. Accordingly, the image captured by side imager 8b may not include an image of a barcode 20. However, if a barcode 20 is positioned on the back side 22e of the item 18, an image of the barcode 20 can be captured by the side imager 8b. The image of the barcode 20 is identified and transformed into electrical signals. The electrical signals are then decoded into alphanumeric characters or other data that can be used as input to a data processing system, such as a POS terminal (e.g., an electronic cash register). A method of scanning an optical code on an item, according to an embodiment of the present disclosure, is discussed more fully below with reference to FIG. 22.

The side imagers 8a/b of the scanner-scale 2 are positioned below and toward the edges of the weigh platter 6. The line of sight of each side imager 8a/b is initially directed upward through a side imager lens 7a/b. A side imaging mirror 9a/b is positioned substantially above the weigh platter 6 to bend or fold the line of sight and the FOV 11b, and thereby direct the line of sight and the FOV 11b sideward in a desired direction sidewardly and upwardly toward the scan volume, which is preferably positioned above the center of the weigh platter 6. For example, mirror 9b directs the line of sight and the FOV 11b of the customer side imager 8b toward the checker side 16 of the scanner-scale 2. For the sake of simplicity, only the FOV 11b of the customer side imager 8b is depicted in FIGS. 1 and 2. Each side imager 8a/b will have an FOV and each FOV can have similar features, characteristics, and advantages as are described herein with reference to the FOV 11b, although the FOV of each side imager 8a/b may be positioned or directed to face in a different direction. Moreover, the side imagers 8a/b need not be identical, or identically configured, and yet may retain many or all of the features, characteristics, and advantages disclosed.

Positioning a mirror 9a/b above the weigh platter 6 provides a more direct line of sight to an item 18 (and a barcode 20 thereon) that is passed through the scan volume. Moreover, the line of sight from a mirror 9a/b positioned above the weigh platter 6 is flatter, more closely approaching parallel to the top of the weigh platter 6 than is possible from a mirror or other optical device positioned below the weigh platter 6. A flat line of sight that approaches parallel with the top of the weigh platter 6 enables improved scanning of one or more of the lateral sides 22a/b/d/e of the item 18; specifically the leading side 22a, the trailing side 22b, the front side 22d, and the back side 22e of the item 18. The line of sight and the FOV of an imager are discussed in greater detail below with reference to FIG. 2. How a line of sight that is more closely parallel with the weigh platter 6 improves scanning of one or more sides 22 is also discussed in greater detail with reference to FIG. 2.

A housing 10a/b can be provided to protect the side imaging mirrors 9a/b and/or side imagers 8a/b from damage. In FIG. 1, the housing 10a/b is illustrated as a rectangular box shape, but may any shape large enough to enclose the optical components (9a/b, 34a/b) it encloses. The housing 10a/b preferably has a low vertical profile above the weigh platter 6 so as to not interfere with a checker using the scanner-scale 2 or with an item 18 that is passed over the scanner by the checker. More detailed discussion of the dimensions of the housing 10a/b is provided below with reference to FIG. 2. The housing 10b shown in FIG. 1 is depicted as a rectangular box-shape comprised of six sides. The side facing the center of the platter may be open to allow the FOV 11b of the side imager 8b to pass through. The side facing the center may also be a clear window, transparent, translucent, and/or comprise a lens. The side of the housing 10b proximal to the weigh platter 6 (i.e., the bottom side of the housing) is also open on the depicted embodiment to allow the side imager 8b to be positioned below the weigh platter 6. The line of sight of the side imager 8b is directed up through the bottom side toward the side imaging mirror 9a housed within the housing 10b. The side imaging mirror 9b then directs the line of sight and the FOV 11b in the desired direction over the center of the weigh platter 6.

The housing 10a/b, mirror 9a/b, and optional window 34a/b, are preferably affixed to weigh platter 6. The small movement of the weigh platter 6 under operating conditions does not significantly alter the trajectory of the field of view 11b, but allows the imager 8b to view the FOV 11b while the electronic components of the system (such as imager 8b) are not connected to the live load of weigh platter 6. Thus, optimum imaging of the item 18 is obtained without electrical connections to the weigh platter 6.

In another embodiment, the housing 10a/b may comprise rounded bumps or ridges configured to enclose the side imaging mirrors 9a/b and/or the side imagers 8a/b. In another embodiment, the housing 10a/b can comprise a raised rail, for example extending substantially from one lateral edge of the weigh platter to the other along either the checker side 16 or the customer side 17 of the scanner-scale 2. A single rail can house one or more side imaging mirrors and/or side imagers. The housing 10a/b may comprise any suitable shape preferably adapted to substantially enclose and protect one or more side imaging mirrors 9a/b and/or side imagers 8a/b.

In another embodiment, shown in FIG. 2A, the housing may be an optical prism 10c made of a transparent optical material, such as polycarbonate. A portion of the optical prism 10c is a mirrored (reflective) surface 9c. The optical prism 10c also includes a front surface 34c. The optical prism 10c provides a unitary physical structure comprising the features of a housing, a mirror, and a window. The mirrored surface 9c may be formed of a metallic reflective coating on a surface of the optical prism 10c or may be due to total internal reflection of a surface of the optical prism 10c. The mirrored surface 9c directs the FOV of a side imager 8c out the front surface 34c of the optical prism 10c.

The bottom imagers 12a/b of the embodiment of FIG. 1 are positioned below the weigh platter 6 and configured such that the FOV of each bottom imager 12a/b can scan the bottom side 22f of an item 18 passed through the scan volume, as depicted in FIG. 2 and described below with reference to the same. The bottom imagers 12a/b may also be configured to also scan the leading side 22a and/or the trailing side 22b of an item 18 passed through the scan volume. The line of sight and the FOV of the bottom imagers 12a/b are directed through a protective window 24 in the weigh platter 6. One or more bottom imaging mirrors 13a/b, 14a/b, 15a/b are used to fold or bend the FOV, thereby directing the line of sight and the FOV in a desired direction and enabling a compact scanner-scale design having a low vertical profile. The window 24 in the weigh platter 6 allows the mirrors 13a/b, 14a/b, 15a/b to direct the FOV and line of sight of each bottom imager 12a/b such that the FOVs of the bottom imagers 12a/b can form at least a portion of a scan volume, together with the FOVs of the side imagers 8a/b. The positioning and the functioning of the bottom imagers 12a/b and the bottom imaging mirrors 13a/b, 14a/b, 15a/b are discussed in greater detail below with reference to FIGS. 3 and 4.

For the sake of simplicity, the FOVs of the bottom imagers 12a/b are not depicted in FIG. 1, but each bottom imager 12a/b will have an FOV and each FOV can have similar features, characteristics, and advantages as are described herein. Moreover, it will be appreciated that all of the bottom imagers 12a/b need not be identical, or identically configured, yet may retain many or all of the features, characteristics, and advantages disclosed. The FOV of a bottom imager 12a/b is discussed in greater detail below with reference to FIGS. 3 and 4.

The side imagers 8a/b and the bottom imagers 12 a/b can comprise an imaging system, for example, of the type disclosed in U.S. Pat. No. 7,224,540, which is incorporated herein by reference. The side imagers can also comprise a side imaging system, for example, of the type disclosed in U.S. Pat. Pub. No. 20060164541, which is also incorporated herein by reference. The imager 8a/b can also include an illumination system that enables semiconductor components of the imager to capture an image of an optical code. The illumination system may implement an illumination pulsing method for a data reader, as disclosed in U.S. Pat. No. 7,234,641, which is incorporated herein by reference. The imagers 8a/b can further comprise one or more lenses, such as the side imager lenses 7a/b to define the FOV by focusing light onto the imagers 8a/b. How utilizing imagers enables the scanner-scale 2 to have a low vertical profile is discussed in greater detail below with reference to FIG. 2.

In the embodiment of FIG. 1, a back of the scanner-scale 2 may be positioned on the customer side 17 of the scanner-scale 2 facing away from where a checker would operate the scanner-scale 2. Although not depicted, the back of the scanner-scale 2 can contain a power connection, and other connections such as for a network and a POS terminal. The scanner-scale 2 can also include electronics for connection to a POS terminal. Accordingly, such embodiment can also have other connections on the back, including but not limited to monitor connections, network connections, and a keyboard connection.

In other configurations, arms of the planar beam scale (as depicted in FIGS. 12, 12A, and 14 and described below with reference to the same) may comprise the rails of the frame. Described differently, the planar beam scale comprises the supporting frame of the scanner/scale system. The side imagers and/or bottom imaging components are enclosed within the sides or arms of the planar beam scale. While frame 4 and imaging components are illustrated as fixed mounted and not part of the live load, the frame 4 and the imaging components may be integrated with the weigh platter 6, such that the frame and the platter comprise a single piece, which is weighed by the planar beam scale, preferably taking care to provide power and communication in a manner that provides negligible effects on measuring accurate weight of objects 18 placed on the scale to be weighed.

Although the weigh platter 6 as shown in the embodiment of FIG. 1 is substantially planar, the weigh platter may have raised sides on the checker side 16 and customer side 17. Openings in the raised sides allow the FOV of the side imagers to pass through. For example U.S. Pat. No. 6,237,852, which is incorporated herein by reference, discloses in FIG. 10 a multi-plane weigh platter with raised portions on the checker side and the customer side and each of the raised portions having a window. A weigh platter configuration having raised sides may allow the accurate weighing of items that may otherwise overhang the platter 6.

The scanner-scale 2 is shown as a square or rectangular shape in FIG. 1, but may be formed in any suitable shape. For example, the frame and platter can be configured to form a circular or disc shape. Accordingly, the checker side and the customer side of the scanner-scale are determined by the point on the circle that is closest to where a checker may be positioned and the point on the circle that is farthest from where the checker may be positioned. The implied scanning direction is parallel to the lines tangent to the circle at those points. As another example, the scanner-scale 2 can comprise an oval shape. The scanner-scale 2 can comprise any suitable shape.

In another variation, the entire weigh platter 6 of the scanner-scale 2 of FIG. 1 may comprise a glass pane (or window) through which bottom imagers can scan items. In another configuration, the window is only a portion of the platter, while the remainder of the platter is an opaque material, or otherwise different than a transparent window. In still another configuration, the platter does not comprise a window. For example, a scanner-scale that does not include bottom imaging scanners may not include a window. Another configuration of scanner-scale 2 may comprise a weigh platter 6 having multiple small windows positioned at different locations in the weigh platter 6 and proximate to a bottom imager. Each small window is positioned proximate to a bottom imager to allow the FOV of the bottom imager to be directed through the window such that the bottom imager can scan items. The small windows are only as large as necessary to allow the FOV of a single bottom imager to be directed through without being limited in size by the window. The smaller surface area of the small windows makes them less prone to damage such as scratches caused by a checker dragging an item across the platter than a larger window.

Figure 7:
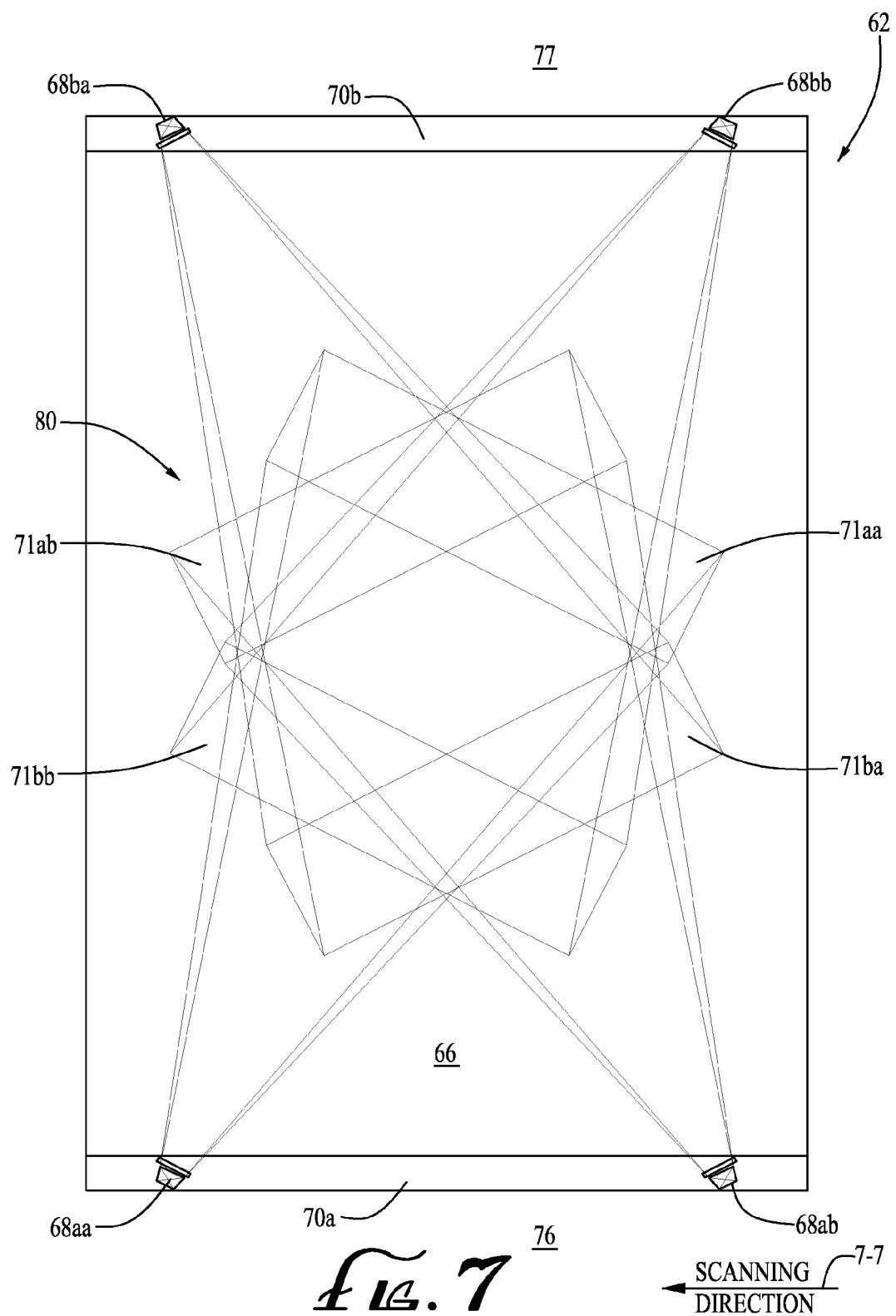
FIG. 7 is a top view of another embodiment of an imaging scanner-scale, depicting the portion of the scan volume formed by the FOVs of the side imagers.

In another embodiment, the side imagers are positioned above the weigh platter. Accordingly, no side imaging mirrors are necessary to direct the FOV of the side imagers. One such embodiment is depicted in FIG. 7, and discussed below with reference to the same. Moreover, in other variations, a plurality of side imagers can be positioned on the checker side of the scanner-scale, a plurality of side imagers can be positioned on the customer side of the scanner-scale, or a plurality of side imagers can be positioned on each of the checker side and the customer side of the scanner-scale. The embodiment shown in FIG. 7, and discussed in greater detail below with reference to the same, comprises a plurality of side imagers on both the checker side and the customer side of the scanner scale.

FIG. 2 is a side view of the imaging scanner-scale 2 of FIG. 1. The weigh platter 6 rests on, and is supported by, a planar beam scale positioned within the frame 4 as depicted in FIGS. 15 and 16, and as discussed below in greater detail with reference to the same. When the top of the weigh platter 6 is positioned at counter level c, the scanner-scale 2 has a depth of d. The depth d includes the thickness of the weigh platter 6 and the depth of the frame 4. In one preferred configuration, the scanner-scale 2 has a depth d not to exceed about two inches (5 cm) below the counter level c. In some embodiments, the depth d approaches one inch (2.5 cm) below the counter level c. In still other embodiments, the depth d is at or less than one inch (2.5 cm) below the counter level c. The scanner-scale 2, with a depth of preferably two inches (5 cm) or less, may have a sufficiently thin vertical profile to allow a cash drawer to be positioned below the scanner-scale 2 at a check stand and still allow a checker to be seated at the check stand.

The side imager housing 10*a/b* rises to a height of h above the counter level c. In one preferred configuration, the height h above the counter level c is approximately ½ an inch (1.25 cm) above the counter level c. In another embodiment, height h above the counter level c is one inch (2.5 cm) or less. In still another embodiment, the height h above the counter level is less than ½ an inch (1.25 cm). The relatively low height h, of approximately ½ an inch (1.25 cm) above the counter level c, is sufficiently inconsequential to not significantly interfere with the processing of purchases by a checker. Moreover, the positioning of the side imager housing 10*a/b* and/or side imager 8*a/b* and/or side imaging mirror 9*a/b* on the edge at the checker side 16 and/or the customer side 17 further reduces any impact of any height h above the counter level c on use of the scanner-scale 2 by a checker.

The configuration of the imagers 8*a/b* and 12*a/b* allow the relatively thin vertical profile of the scanner-scale 2. In existing scanners employing laser diode scanning technology, a rotating mirror or facet wheel which disperses a laser beam into separate scan lines occupies significant space. Moreover, the mirrors and lenses that direct the scan lines, and that collect the reflections of the scan lines, occupy significant space. One example of a scanner employing laser diode scanning technology is depicted in U.S. Pat. No. 7,198,195, as previously mentioned. The imagers 8*a/b* and 12*a/b* do not require a rotating facet wheel or collection mirrors, thus eliminating a need for substantial space below the weigh platter 6.

Also depicted in FIG. 2 is the FOV 11*b* of the side imager 8*b*. The FOV 11*b* is defined by the angle of view 30*b* of the side imager 8*b* and by a line of sight 28*b* of the customer side imager 8*b*, as directed by the side imaging mirror 9*b*. The side imager 8*b* captures an image of all that is within the FOV 11*b*. Objects that are within the depth of field will be substantially in focus in the image. The line of sight 28*b*, the angle of view 30*b*, and the FOV 11*b* can also be directed or otherwise influenced by optical components, such as the side imaging mirror 9*b*, a lens of the side imager 7*b*, the location of the imager 8*b*, a side imaging housing lens or window 34*b*, and/or other optical components.

In the scanner-scale 2 of FIG. 2, the FOV 11*b* of a side imager 8*b* is positioned primarily above the weigh platter 6 (i.e. a greater portion of the FOV 11*b* is positioned entirely above the weigh platter 6). For example, the portion of the FOV 11*b* from side imaging mirror 9*b* to the scan volume is positioned entirely above the weigh platter 6. In other configurations, the greater portion of the FOV 11*b* (which is positioned entirely above the weigh platter 6) can be positioned between the scan volume and an optical component that is positioned substantially above the weigh platter 6 As noted, such optical component positioned above the weigh platter 6 can be any of a side imaging mirror, a side imaging housing lens, a semiconductor component of the side imager, and/or a lens of the side imager.

Positioning an optical component substantially above the weigh platter 6 allows a more direct line of sight from the optical component to an item 18 positioned in the FOV 11b of the side imager 8b. This positioning allows the FOV 11b of the side imager 8b to cover a more expansive area from the weigh platter 6 to a height above the weigh platter 6 than is possible by directing the FOV 11b from below the weigh platter 6. The line of sight 28b is more closely perpendicular to the back side 22e of the item 18 that the side imager 8b is scanning. Also, the line of sight 28b is flatter, or at a smaller angle as measured vertically above the plane of the weigh platter 6, than is possible with a FOV 11b that is directed from below the weigh platter 6. Accordingly, the FOV 11b of the customer side imager 8b at any given distance from the side imaging mirror 9b is more closely perpendicular to the weigh platter 6, thereby improving scanning of one or more lateral sides 22a/b/d/e of the item 18.

Positioning the FOV 11b more closely perpendicular to the weigh platter 6 improves scanning of one or more lateral sides 22a/b/d/e of the item 18 because the FOV 11b is more closely parallel to the back side 22e of the item 18 being scanned. Checkers tend to scan an item 18 with a side 22 positioned as the bottom side 22f and parallel to the weigh platter 6. As depicted in FIG. 2, the bottom side 22f of item 18 is substantially parallel with weigh platter 6. Typically items have one or more sides that lie in a plane that is perpendicular to the plane of the bottom side 22f. For example, the lateral sides 22a/b/d/e, or more specifically the leading side 22a, the trailing side (not shown), the front side 22d, and the back side 22e, are each perpendicular to the bottom side 22f. An FOV 11b that is substantially perpendicular to the weigh platter 6 is substantially parallel with the side 22 to be scanned. The angle of a scanned side relative to the side imager 8b is reduced, thereby reducing skewing and distortion of the image that is captured.

For example, the back side 22e of the item 18, when scanned, is nearly perpendicular to the weigh platter 6. An FOV of a side imager directed from below the weigh platter 6 would capture the back side 22e of the item 18 at a significant angle. Accordingly, a barcode 20 in the captured image may appear significantly skewed and/or distorted. A skewed and/or distorted image of the barcode 20 may not be recognized as a barcode and/or may not be properly read and decoded. Accordingly, the scan of the item may be unsuccessful. The probability of an unsuccessful scan increases as the angle of the FOV relative to a barcode to be scanned increases.

Directing the FOV from an optical component positioned above the weigh platter 6 also reduces the need for a large window in the weigh platter 6 to allow the FOV of the side imager to be directed toward a scan volume positioned substantially above the center of the platter. As previously described, in order to capture an image that can be used to read a bar code on the front side 22d or the back side 22e of an item 18, the line of sight and FOV of a side imager should be directed at a small angle (less than about 30 degrees and more preferably less than about 20 degrees) relative to the plane of the weigh platter 6. If the line of sight and FOV are directed from below the weigh platter 6, the FOV necessarily would pass through a substantial area of the platter, due to the small angle relative to the weigh platter 6, so as to encompass the desired area above the center of the weigh platter 6 that is the desired position of the scan volume. Because the FOV would pass through a substantial area of the weigh platter 6, a large window in the platter would be necessary. A large window is more likely to be scratched or damaged during use, such as by items that are dragged across the window. To minimize scratching, the windows in platters are made of high quality expensive materials, such as sapphire glass, designed to resist scratching. A large window can significantly increase the cost of materials to manufacture a scanner, simply due the cost of the materials of the window. Accordingly, a large window in a weigh platter 6 is less desirable, and an optical component positioned above the weigh platter 6 to direct the FOV from above the weigh platter 6 can avoid the costs of a large window in the weigh platter 6.

Due to the small nature of the imaging components 8b, 7b, and 9b, imaging of a field of view 11b suitable for reading the customer side 22e of an object 18 can be obtained without the use of a tall or thick vertical structure. In contrast, a typical bioptic laser scanner has a tall and thick vertical section that protrudes into the desired area of product flow. Furthermore, the low profile of the imaging components 8a, 7a, and 9a, provides superior reading of the checker side 22d of an object 18 without disturbing the product flow, compared to a typical bioptic laser scanner which reads side 22d from through a window in the weigh platter 6, which offers a less desirable viewpoint.

FIG. 2 also illustrates that the scanner-scale 2 can include empty compartments 52a/b where electronics 53a/b can be positioned and/or supported. For example, electronics 53a/b for processing images captured by the side imagers 8a/b can be positioned and/or supported in the empty compartments 52a/b of the scanner-scale 2. FIG. 15 depicts the position of the empty compartments 52a/b (and any electronics positioned therein) relative to the planar beam scale, frame 4, weigh platter 6, and imaging optical components, as discussed below in greater detail with reference to the same. Electronics for processing images captured by the checker side imager 8a can be positioned in the checker side empty compartment 52a, and electronics for processing images captured by the customer side imager 8b can be positioned in the customer side empty compartment 52b. As another example, electronics for a POS terminal can be positioned and/or supported in the empty compartments 52a/b of the scanner-scale 2. This arrangement can allow a POS terminal to be readily integrated with the scanner-scale 2.

Figure 3:
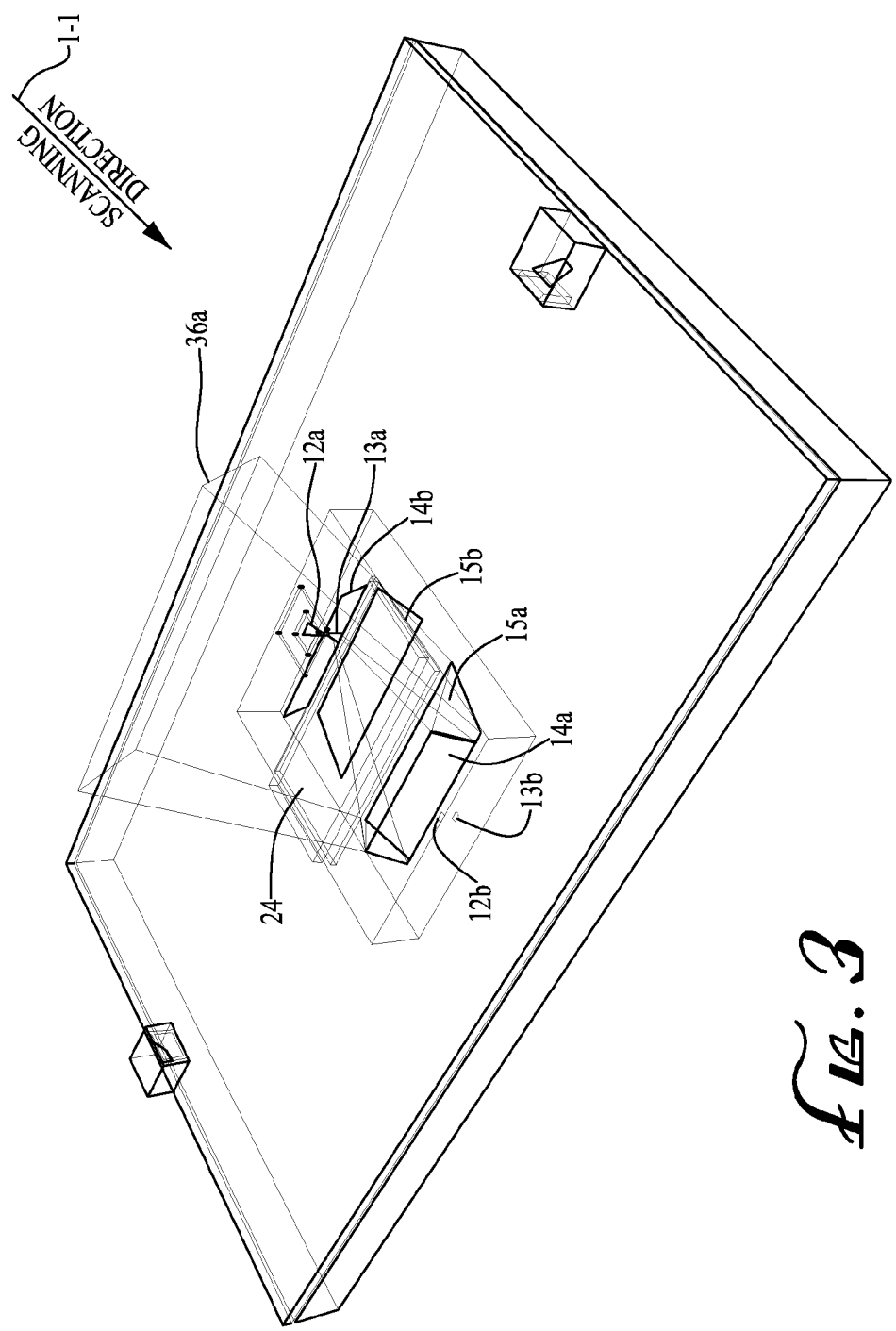
FIG. 3 is a perspective view of the imaging scanner-scale of FIG. 1, depicting an FOV of a bottom imager.

FIG. 3 is a perspective view and FIG. 4 is a cross-sectional side view of the imaging scanner-scale 2 of FIG. 1. FIGS. 3 and 4 depict an FOV 36a of a leading bottom imager 12a. As mentioned previously, the scanner-scale 2 comprises one or more bottom imagers 12a/b configured to scan the bottom side of an item. As shown in FIGS. 3 and 4, two bottom imagers 12a/b are provided: a leading bottom imager 12a and a trailing bottom imager 12b. The bottom imagers 12a/b are positioned below the platter and face down and away from the platter. The line of sight and the FOV 36a of a bottom imager 12a is directed by the bottom imaging mirrors 13a, 14a, 15a through a protective window 24 in the platter. For the sake of simplicity, only the FOV 36a of the leading bottom imager 12a is depicted, although the trailing bottom imager 12b preferably has an FOV that is similar to the FOV 36a, but in the opposite direction. The bottom imaging or fold mirrors 13a/b, 14a/b, 15a/b fold or bend the FOVs of the bottom imagers 12a/b in the desired direction.

The FOV 36a of the leading bottom imager 12a is initially directed by a first leading bottom imaging mirror 13a to a second leading bottom imaging mirror 14a. The FOV 36a is then directed from the second leading bottom imaging mirror 14a to a third leading bottom imaging mirror 15a. The third leading bottom imaging mirror 15a directs the FOV 36a through a window 24 in the weigh platter 6. The FOV 36a is directed at an angle through the weigh platter 6 such that the leading bottom imager 12a can capture an image of the leading side 22a and the bottom side 22f of an item 18 that is passed through the scan volume in the scanning direction, which is indicated by the arrow 1-1. As can be appreciated, the FOV of the trailing bottom imager 12b is similarly directed to scan the bottom side 22f and the trailing side 22b. The FOV of the trailing bottom imager 12b is directed by a first trailing bottom imaging mirror 13b, a second trailing bottom imaging mirror 14b, and a third trailing bottom imaging mirror 15b, as best viewed in FIG. 4.

FIG. 4 also illustrates how utilizing bottom imaging mirrors 13a/b, 14a/b, 15a/b to fold the FOV 36a allows the scanner-scale 2 to have a more slender vertical profile. With the mirrors 13a/b, 14a/b, 15a/b, the vertical profile of the scanner-scale 2 can have a depth d. The outline of the FOV 44 that is indicated in broken lines and which is not folded, leads to the position 46 where a bottom imager would need to be located without utilization of the bottom imaging mirrors 13a/b, 14a/b, 15a/b to fold and direct the FOV 36a. As shown, without bottom imaging mirrors 13a/b, 14a/b, 15a/b, the profile of the scanner-scale 2 would necessarily have a depth d' to provide bottom scanning. Existing scanners generally have a vertical profile with a depth d' to provide bottom scanning. The depth d' is greater than depth d and inhibits ergonomic placement of a cash drawer beneath the scanner-scale 2. The depth d' is on average four to seven times greater than depth d. Even in laser bioptic scanners, which use different design principles, the depth d' of those scanners is of similar magnitude, which is on average four to seven times greater than depth d.

The bottom imager 12a can be configured to capture separate images of the leading side 22a and the bottom side 22f of the item 18. First an image of the leading side 22a is captured as the item 18 enters the FOV 36a. Then, as the item 18 continues to pass through the FOV 36, an image of the bottom side 22f can be captured. In another embodiment, the bottom imager 12a may capture one or more images that encompass at least a portion of both the leading side 22a and the bottom side 22f of the item 18. As described above, a captured image can be processed to identify a barcode. The barcode is converted to data that can, for example, be used by a POS terminal to look up pricing information for the scanned item 18. Typically the bottom imager 12a is continuously capturing images which are processed to locate barcodes. It is typically unimportant upon which side of the item 18 the barcode is located, so if a captured image contains a barcode that can be decoded, this data is sent to the POS terminal. Sequential images containing the same barcode can be ignored for a period of time, since they are assumed to correspond to the same item 18. After a suitable timeout period, which may be called a double read timeout, the system can again look for the same barcode data in the image data, as it is assumed to correspond to a new item 18.

FIG. 4 also shows empty compartments 54a/b within scanner-scale 2 where electronics 55a/b can be positioned and/or supported. A portion of the empty compartments 54a/b may be occupied by arms of the planar beam scale, as described below with reference to FIGS. 14 and 15. Depending on the configuration of bottom imaging mirrors 13a/b, 14a/b, 15a/b, however, space may be left to house electronics. For example, electronics for processing images captured by the bottom imagers 12a/b can be positioned and/or supported in the empty compartments 54a/b of the scanner-scale 2. Electronics for processing images captured by the leading bottom imager 12a can be positioned in the leading side empty compartment 54a, and electronics for processing images captured by the trailing bottom imager 12b can be positioned in the trailing side empty compartment 54b. As another example, electronics for a POS terminal can be positioned and/or supported in the empty compartments 54a/b of the scanner-scale 2.

As can be appreciated, although the bottom imaging mirrors 13a/b, 14a/b, 15a/b are shown in FIGS. 3 and 4 as being substantially planar and square, other shapes are possible. For example the mirrors may be curved, for example to provide a concave or convex reflective surface. The curvature of a mirror may affect the magnification properties of the mirror. Hence one or more of the mirrors may be curved to properly direct and adjust the FOV of the imagers. The mirrors may also have a shape other than square, such as circular, elliptical, rectangular, trapezoidal, or any other suitable shape. Moreover, it can be further appreciated that the bottom imaging mirrors of the other embodiments disclosed herein, including the embodiments of FIGS. 8, 9, and 11, may also have alternative shapes than depicted in the figures. Furthermore, the side imaging mirrors, including the side imaging mirrors 9a/b of FIGS. 1 and 2, may have alternative shapes than depicted in the figures.

FIG. 5 is a perspective view of the imaging scanner-scale 2 of FIG. 1 depicting the FOVs 11a/b for the side imagers 8a/b and the FOVs 36a/b for the bottom imagers 12a/b and the scan volume 50 that the FOVs 11a/b, 36a/b define. FIG. 6 is a top view of the imaging scanner-scale 2 of FIG. 1, also depicting the FOVs 11a/b, 36a/b of the imagers 8a/b, 12a/b and the scan volume 50 that the FOVs 11a/b, 36a/b define. The FOV 11a of the checker side imager 8a is shown in relation to the previously depicted FOV 11b of the customer side imager 8b. Also, the FOV 36b of the trailing bottom imager 12b is shown in relation to the previously depicted FOV 36a of the leading bottom imager 12a. Moreover, the FOVs 36a/b of the bottom imagers 12a/b are shown in relation to the FOVs 11a/b of the side imagers 8a/b. The FOVs 11a/b, 36a/b each form a portion of the scan volume 50.

As mentioned above, the scan volume 50 is a space in which optimal scanning of an item 18 (depicted in FIG. 5) can occur. An operator passes the item 18 in the scanning direction (as indicated by the arrow 5-5) over the window 24 of the weigh platter 6 and through the scan volume 50. As the item 18 passes through the scan volume, the checker side imager 8a captures the image in the FOV 11a, which can include the front side 22d of the item 18, and attempts to read a barcode 20 positioned thereon. The image captured by the checker side imager 8a may also include a portion of the leading side 22a, trailing side 22b, and/or bottom side 22f. The customer side imager 8b captures the image in the FOV 11b, which can include the back side 22e of the item 18, and attempts to read a barcode 20 positioned thereon. The image captured by the customer side imager 8b may also include a portion of the leading side 22a, trailing side 22b, and/or bottom side 22f. The leading bottom imager 12a captures the image in the FOV 36a, which can include a portion of the leading side 22a and/or the bottom side 22f of the item 18, and attempts to read a barcode 20 positioned thereon. Finally, the trailing bottom imager 12b captures the image in the FOV 36b, which can include a portion of the trailing side 22b and/or the bottom side 22f of the item 18, and attempts to read a barcode 20 positioned thereon. In this manner, images of all sides 22 of the item 18, except for the top side 22c, are captured. Images of all the lateral sides 22a/b/d/e are captured without aid of a vertical scanner window. Although not depicted in the figures, an additional top imager could be positioned at a suitable position above the scan volume to enable scanning of the top side 22c of the item 18. For example, the top imager could be positioned on the underside of a monitor or other display of a POS terminal, or in a ceiling mounted or pole-mounted configuration, such as on the pole of the remote display that indicates the weight from the scale. As another example, the top imager could be positioned on the underside of a check-writing stand above the counter of the check stand.

As is shown in FIGS. 5 and 6, passing the item 18 through the scan volume 50 allows a higher probability that an optical code, such as a barcode 20, on the item 18 will be successfully scanned. The probability of a successful scan is high because the FOVs 11a/b, 36a/b of multiple imagers 8a/b, 12a/b are directed to the item 18. The multiple imagers 8a/b, 12a/b can capture images of multiple sides 22 of the item 18 to read a barcode 20 positioned on any of those multiple sides 22 (except the top side 22c). The likelihood that a barcode 20 is not read as the item 18 is scanned is reduced, thereby enhancing the first-pass read rate (FPRR). The number of successful scans increases, and the number of re-scans required is reduced. Increased scanning efficiency and reduced re-scans correspondingly increase checker efficiency. Moreover, because the checker does not have to orient the item 18 to place barcode 20 in a preferred position, the ergonomics and the throughput of the scanning operation are also improved.

FIG. 7 is a top view of another embodiment of an imaging scanner-scale 62. The scanner-scale 62 has a plurality of side imagers 68aa/ab on the checker side 76 of the scanner-scale 62 and a plurality of side imagers 68ba/bb on the customer side 77 of the scanner-scale 62. FIG. 7 also depicts the FOVs 71aa/ab/ba/bb of the side imagers 68 and the scan volume 80 defined by the FOVs 71aa/ab/ba/bb. The side imagers 68 can be configured to scan at an angle that may capture an image including a portion of at least two sides of an item. For example, assuming a scanning direction indicated by the arrow 7-7, and assuming a side of the box-shaped item 18 is facing the checker, a first checker side imager 68aa can be configured to scan at an angle that may capture an image that includes a portion of both the front side of an item and a portion of the leading side of the item. A second checker side imager 68ab can be configured to scan at an angle that may capture an image that includes a portion of both the front side of the item and the trailing side of the item. Similarly, a first customer side imager 68ba can be configured to scan at an angle that may capture an image that includes a portion of both the back side of the item and the leading side of the item. A second customer side imager 68bb can be configured to scan at an angle that captures an image including a portion of both the back side of the item and the trailing side of the item.

The side imagers 68aa/ab/ba/bb of the scanner-scale 62 of FIG. 7 can be positioned above the weigh platter 66, such that the portion of the FOVs 71 aa/ab/ba/bb from the scan volume 80 to the imager 68aa/ab/ba/bb is entirely above the weigh platter 66. The scanner-scale 62 further includes side rails 70a/b that run along a portion of the checker side 76 and the customer side 77 to house one or more of the side imagers 68aa/ab/ba/bb. A checker side rail 70a houses the checker side imagers 68aa/ab, and a customer side rail 70b houses the customer side imagers 68ba/bb. Similar to a side imaging housing 10a/b of the scanner-scale 2 shown in FIG. 1, the side rails 70a/b preferably have a height that is approximately ½ an inch (1.25 cm) above the counter level or less.

In another embodiment, the side imagers may be staggered, upwardly aimed at different angles, such that a first side imager scans a lower (i.e. closer to the weigh platter 66) portion of a particular side of an item and a second side imager scans a higher (i.e. further from the weigh platter 66) portion of the same side of the item.

The scanner-scale 62 may further incorporate bottom imagers in the same manner as described in other embodiments, such as the embodiments depicted in FIGS. 8 and 9 and described below with reference to the same.

Figure 8:
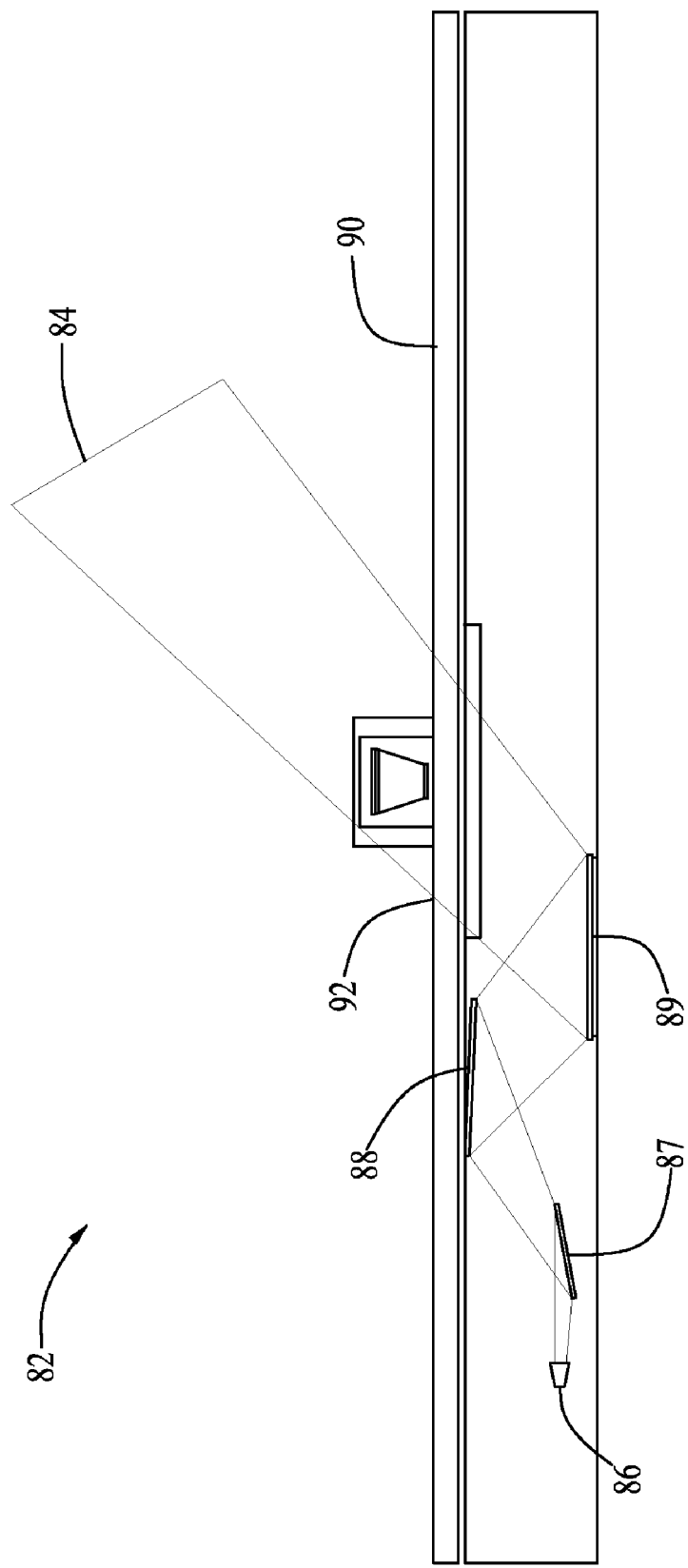
FIG. 8 is a side view of another embodiment of an imaging scanner-scale, depicting an FOV of a bottom imager.

FIG. 8 is a side view of another embodiment of an imaging scanner-scale 82 having another configuration of bottom imaging mirrors. FIG. 8 depicts the FOV 84 of a bottom imager 86 directed by a plurality of bottom imaging mirrors 87, 88, 89. The bottom imager 86 is positioned toward a side of the scanner-scale 82 and the FOV 84 is folded using mirrors 87, 88, 89 to direct the FOV 84. The configuration of bottom imaging mirrors 87, 88, 89 allows for a scanner-scale design having a low vertical profile.

In the embodiment of a scanner-scale 82 of FIG. 8, the FOV 84 of bottom imager 86 is first directed to a first mirror 87. The first mirror 87 directs the FOV 84 to a second mirror 88. The second mirror 88 directs the FOV 84 to a third mirror 89. The third mirror 89 directs the FOV 84 up through a window 92 in a platter 90. The FOV 84 expands with distance from the imager. The redirections of the FOV 84 caused by the mirrors 87, 88, and 89 allow the FOV 84 to sufficiently expand such that as the FOV 84 passes up through the window 92 in the platter 90, the FOV 84 is expansive enough to effectively scan one or more sides of an item. The angle that the FOV 84 is directed through the window 92 can be configured according to placement and/or angle of the mirrors 87, 88, 89. The FOV 84 is angled to scan primarily the bottom side of an item. Alternately, the FOV 84 may be angled to scan the leading side or the trailing side, in addition to the bottom side.

FIG. 9 is a side view of an imaging scanner-scale 102 having another configuration of bottom imaging mirrors to direct an FOV of a bottom imager. As shown, the FOV 104 of a bottom imager 106 is directed with only two bottom imaging mirrors 107, 108. The number of bottom imaging mirrors is reduced from three to two by directing the FOV 104 through a hole 110 in the second bottom imaging mirror 108. This configuration can be referred to as an "on-axis geometry."

Figure 9A:
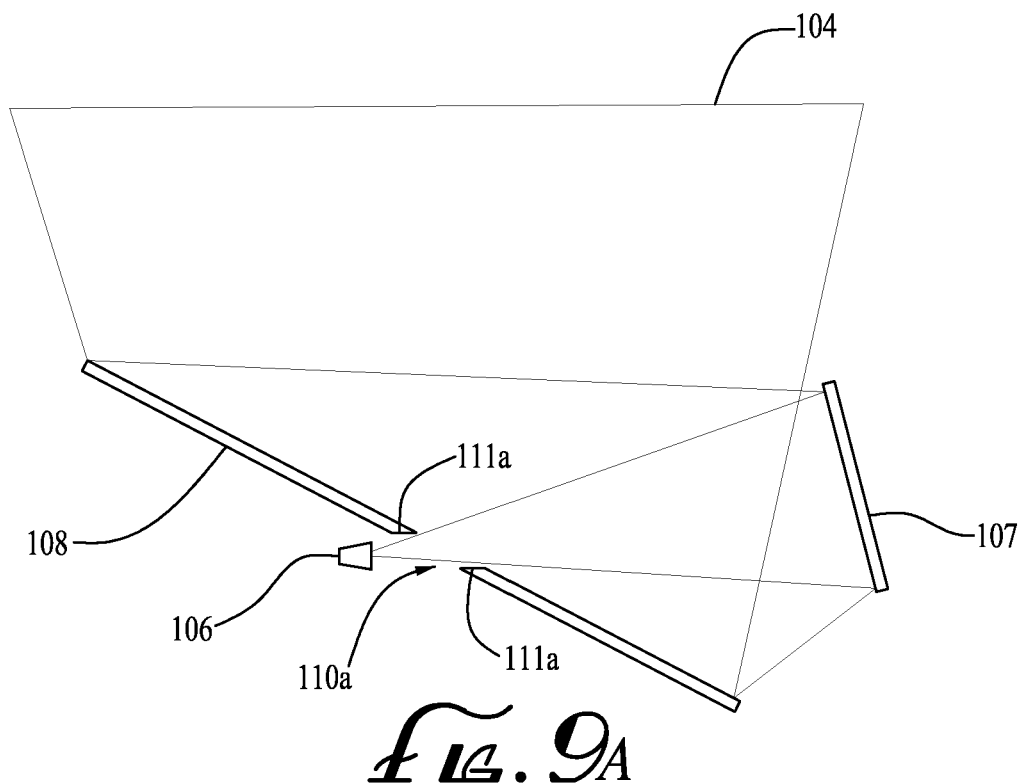
FIG. 9A is a close-up side view of a hole through a bottom imaging mirror of the imaging scanner-scale of FIG. 9.

FIG. 9A is a cross-sectional side view showing the hole 110a in the second bottom imaging mirror 108 of the bottom imaging mirror configuration shown in FIG. 9. In FIG. 9A, the hole 110a is a circular bore that is formed in, such as for example drilled through, the second imaging mirror 108 at the same angle to the mirror 108 that the line of sight of the imager 106 is directed relative to the mirror 108. Stated differently, the sides 111a of the hole 110a are substantially parallel to the line of sight of the imager 106. The direction and shape of the bore to form the hole 110a is relevant with respect to the effect the hole has on the captured image, as discussed in greater detail below with reference to FIG. 9 and FIGS. 10A and 10B. Alternatively, there may be no physical hole in mirror 108. Because mirrors are typically metal films deposited on a glass or plastic substrate, region 110a in the mirror 108 may be a region on the substrate of the mirror 108 that is not metal coated. Therefore, this region 110a would be transparent and act optically as a hole or an aperture. A region of a mirror 108 lacking reflective metalization on the glass substrate can be readily manufactured in any arbitrary shape. In still another embodiment, a lens element may be placed in the hole 110 of the mirror 108 or molded into the non-reflective section of the substrate of the mirror 108.

As previously noted, the mirrors of the various embodiments disclosed herein are depicted as substantially planar and square, However, it can be appreciated that the mirrors, including the two bottom imaging mirrors 107, 108, may have a different shape. For example, the bottom imaging mirrors 107, 108 may have a curved surface. The bottom imaging mirrors 107, 108 may be curved in a manner that presents a concave or convex reflective surface. The curvature of mirrors 107, 108 may magnify the FOV 104 of the bottom imager 106. Furthermore, the bottom imaging mirrors 107, 108 may have a circular, elliptical, or rectangular shape, or any other shape suitable to properly direct the FOV 104 of the imager 106.

Figure 9B:
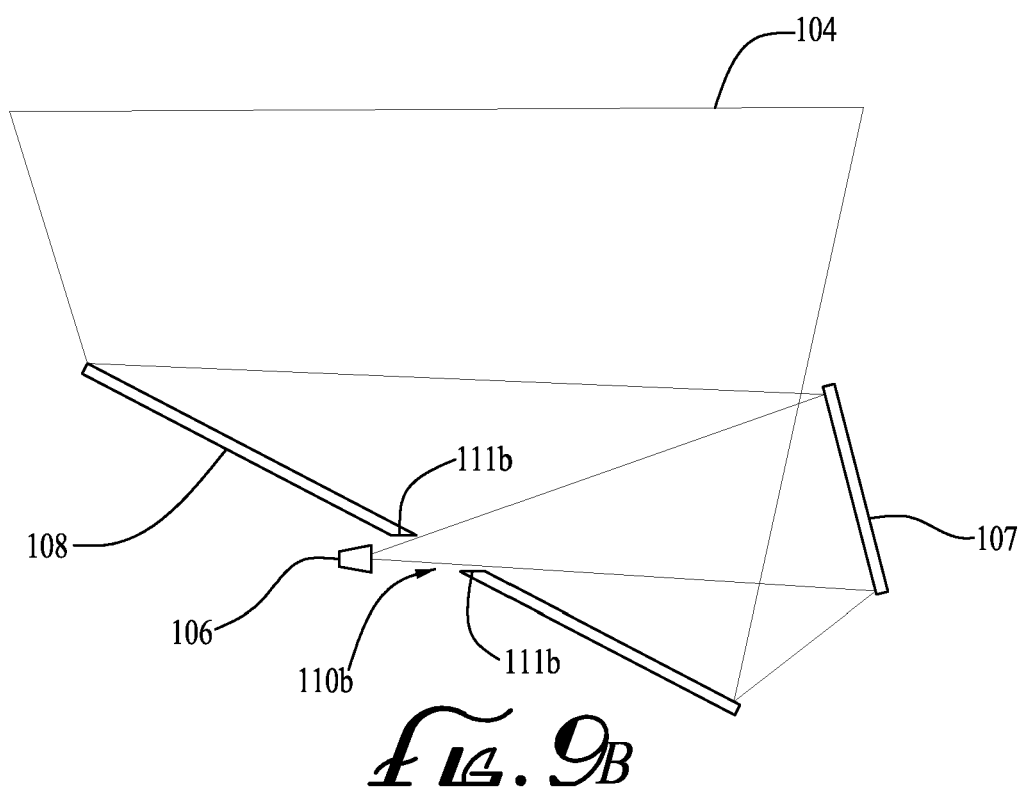
FIG. 9B is a close-up side view of another type of hole through a bottom imaging mirror of the imaging scanner-scale of FIG. 9.

FIG. 9B is a cross-sectional side view showing another embodiment of the hole 110*b* in the second side imaging mirror 108 of the bottom imaging mirror configuration shown in FIG. 9. In FIG. 9B, the hole 110*a* is a square bore that is formed through the second imaging mirror 108 at an angle perpendicular to the surface of the mirror 108. Stated differently, the sides 111*b* of the hole 110*a* are substantially perpendicular to the reflective surface of the mirror 108. As mentioned, the direction and shape of the bore to form the hole 110*b* is relevant with respect to the effect the hole has on the captured image, as discussed in greater detail below with reference to FIG. 9 and FIGS. 10A and 10B. As noted above, in another embodiment, a lens element may be placed in the hole 110*a* of the mirror. In another embodiment, there may not be a hole, but rather a transparent region of the mirror that acts optically as a hole or aperture.

Figure 10A:
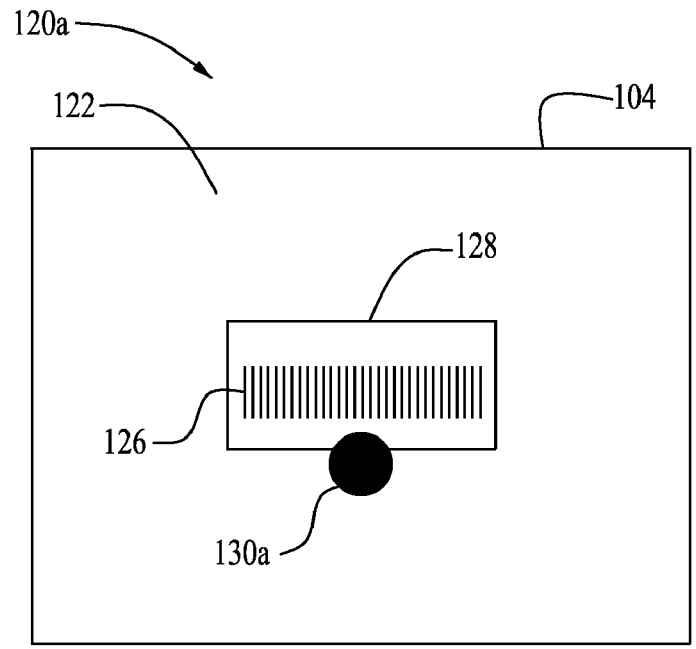
FIG. 10A is a diagrammatic representation of an exemplary image captured by a bottom imager as depicted in FIG. 9A, according to one embodiment of the present disclosure.
Figure 10B:
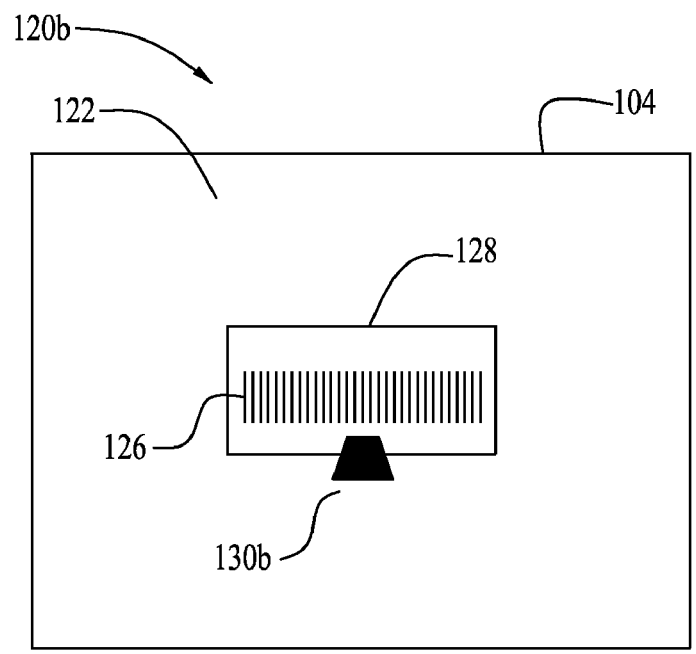
FIG. 10B is a diagrammatic representation of an exemplary image captured by a bottom imager as depicted in FIG. 9B, according to another embodiment of the present disclosure.

With continued reference to FIGS. 9, 9A, and 9B, the FOV 104 is relatively narrow in the region close to the imager 106, as shown. The FOV 104 gradually expands as distance from the imager 106 increases. Accordingly, if the imager 106 is positioned close to the second mirror 108, only a very small hole or aperture 110 in the second mirror 108 is needed for an expansive FOV 104 farther away from the bottom imager 106. The FOV 104 expands and is directed from the first bottom imaging mirror 107 back toward the imager 106 to the second bottom imaging mirror 108. At the second bottom imaging mirror 108, the FOV 104 is sufficiently expanded such that the small hole or aperture 110 represents only a small portion of the entire FOV 104. The size of the hole or aperture is illustrated in FIGS. 10A and 10B. The FOV 104 is directed by the second mirror 108 up through a window 114 in a platter 112, except for the small portion of the FOV 104 that is not directed due to the hole or aperture 110. Accordingly, the images captured by a bottom imager 106 with an FOV 104 directed using an on-axis geometry will have a gap in the image, or area of lost pixels.

FIGS. 10A and 10B are diagrammatic representations of images 120*a/b* captured by the bottom imager 102 of FIG. 9 having an FOV 104 that is directed by mirrors in an on-axis configuration similar to that of the mirrors 107 and 108 of FIG. 9. The images 120*a/b* have an area of lost pixels 130*a/b* corresponding to the holes in the mirror. However, as is evident from FIGS. 10A and 10B, the lost pixels do not result in significant data loss. In FIGS. 10A and 10B, a side 122 of an item is captured in the images 120*a/b*. A barcode 126 is on a label 128 that is affixed to the side 122 of the item. The hole or aperture 110*a/b* in the mirror 108 causes the area of lost pixels 130 in the image 120. However, because the image 120 is captured for the purpose of identifying and reading an optical code such as a barcode 126, the lost pixels do not result in significant loss of data. Enough pixels are captured and preserved to identify and read the barcode 126. Accordingly, the image 120 is sufficient for the intended objective and the lost pixels are of little consequence and can be ignored.

FIG. 10A is a diagrammatic representation of an image captured by an imager 106 directed through a circular hole or aperture 110*a* in a second mirror 108 in the configuration depicted in FIG. 9A. The circular shape of the hole, formed (such as for example drilled) parallel to the line of sight, or circular region of unmetalized glass that forms a clear aperture, results in an area of lost pixels 130*a* that is circular. If the hole were formed perpendicular to the surface of the mirror, the area of lost pixels 130*a* would appear elliptical or teardrop shaped rather than circular.

FIG. 10B is a diagrammatic representation of an image captured by an imager 106 directed through a hole or aperture 110*b* in a second mirror 108 that is form fitted to the projected FOV 104 as it passes through mirror 108 in the configuration depicted in FIG. 9B. The shape of the hole or aperture, formed perpendicular to the surface of the mirror, results in an area of lost pixels 130*b* that is trapezoidal. Notably, the loss of pixels from this type of hole or aperture 110*b* formed perpendicular to the mirror 108 is smaller than the loss of pixels from a circular hole. However, as can be appreciated, a circular hole may be easier to form (such as by drilling).

As is evident from both FIGS. 10A and 10B, the loss of pixels is minimal, and may not even impact capture of an image of a barcode. Furthermore, the sweeping motion that is typical of scanning items at a retail POS enables multiple useful images to be captured. The multiple images may capture the barcode 126 in different positions relative to the area of lost pixels 130*a/b*. For example, in a first image the barcode 126 may be positioned on a first side of the area of lost pixels 130*a/b*, and in a second image the same barcode 126 may be positioned on the other side of the area of lost pixels 130*a/b*. In some cases the barcode may be captured in the image in a position such that the area of lost pixels 130 includes a portion of the barcode 126, but due to the sweeping action of the scan, a second image can include the portion that was lost in the first image. Data processing techniques can be used to ensure that all barcode data is present when processed.

Although capturing extra images and/or obtaining complete barcode data from multiple images captured by a scanner-scale may require additional processing, this additional processing may be a relatively insignificant cost for the improvements made possible in scanners by the on-axis geometry. These improvements may include greater precision, decreased size, decreased risk of damage to a scanner-scale, decreased risk of defective manufacture of a scanner-scale, and cost savings in manufacturing and the materials of the scanner-scale. The decreased size may be particularly advantageous because the space that is saved may allow additional room underneath the scanner-scale at the check stand, space that may be used to accommodate a cash drawer and/or the legs of a seated checker. Moreover, the space that is saved also allows more space for electronics, whether for better processing of captured images or to integrate a POS terminal with the scanner-scale.

Folding a FOV using mirrors also inherently introduces a degree of imprecision and variability that can limit scanner performance. The mirrors must be precisely positioned to properly direct the FOV in a desired direction. A small misalignment of a single mirror can limit or misdirect the FOV of the imager. Moreover, mirrors that are correctly positioned can be damaged or displaced during use of the scanner-scale. Utilizing an on-axis geometry to reduce the number of mirrors decreases the likelihood of the system being misaligned during manufacturing, and also decreases the likelihood of incapacitating damage to the scanner due to damage to a mirror. Moreover, with the reduction of the number of mirrors, the severity of a misalignment through either faulty manufacturing or incapacitating damage can be reduced. Reducing the number of mirrors also decreases the cost of positioning mirrors during manufacturing, as well as the cost of materials to manufacture the scanner-scale. Furthermore, reducing the number of mirrors reduces the number of reflections, which increases the optical transmission of the imaging system. Because mirrors have a less than perfect reflectivity, each reflection in a mirror reduces the optical transmission of the imaging system. Accordingly, reducing the number of reflections results in improved optical transmission of an imaging system.

FIG. 11 is a side view of still another embodiment of an imaging scanner-scale 132 having another on-axis geometry of bottom imaging mirrors. The scanner-scale 132 comprises two bottom imagers 136a/b. For the sake of simplicity, FIG. 11 depicts only the FOV 134a of the leading bottom imager 136a. The FOV of each imager 136a/b is directed through a hole 140a/b in a bottom imaging mirror 137a/b that directs the FOV of the other imager 136a/b. The FOV 134a is directed through a pre-cut hole 140a in the first trailing bottom imaging mirror 137b to the first leading bottom imaging mirror 137a. Alternately, instead of a hole, the FOV 134a is directed through a clear aperture formed by selective metalization of the glass. The FOV 134a is in turn directed to the second leading bottom imaging mirror 138a and then up through a window 144 in the platter 142. The FOV 134b of the trailing bottom imager 136b may be configured and directed in a similar manner. In this manner the number of bottom imaging mirrors is reduced from three to two. A third bottom imaging mirror is not needed to direct the FOV 134a around another bottom imaging mirror as is present in the mirror configuration of FIG. 4.

FIG. 12 is a planar beam scale 152 of an imaging scanner-scale, such as may be employed in a scanner scale, particularly one of any of the previously described embodiments. The planar beam scale 152 may utilize planar beam technology pioneered by Flintec® of Hudson, Mass. The scale 152 comprises a base portion 154 and two arm portions 156a/b configured in the shape of a "U" or a "C" and defining an inner, partially enclosed area 157. The scale 152 further comprises a top cover 158, which is configured to protect and enclose internal components of the scale 152. The top cover 158 is also configured to abut and support a weigh platter of a scanner-scale. A plurality of contact pads 164 are positioned on the top surface of the top cover 158. In the illustrated configuration, four contact pads 164 are distributed about four corners of the planar beam scale 152. The contact pads are slightly raised relative to the top surface of the top cover and configured to abut with a platter. The top cover 158 is secured by one or more top cover screws 162. In the illustrated embodiment, the contact pads 164 are ring-shaped and surround the one or more top cover screws 162. The top cover screws 162 are recessed within the contact pads 164.

Figure 13:
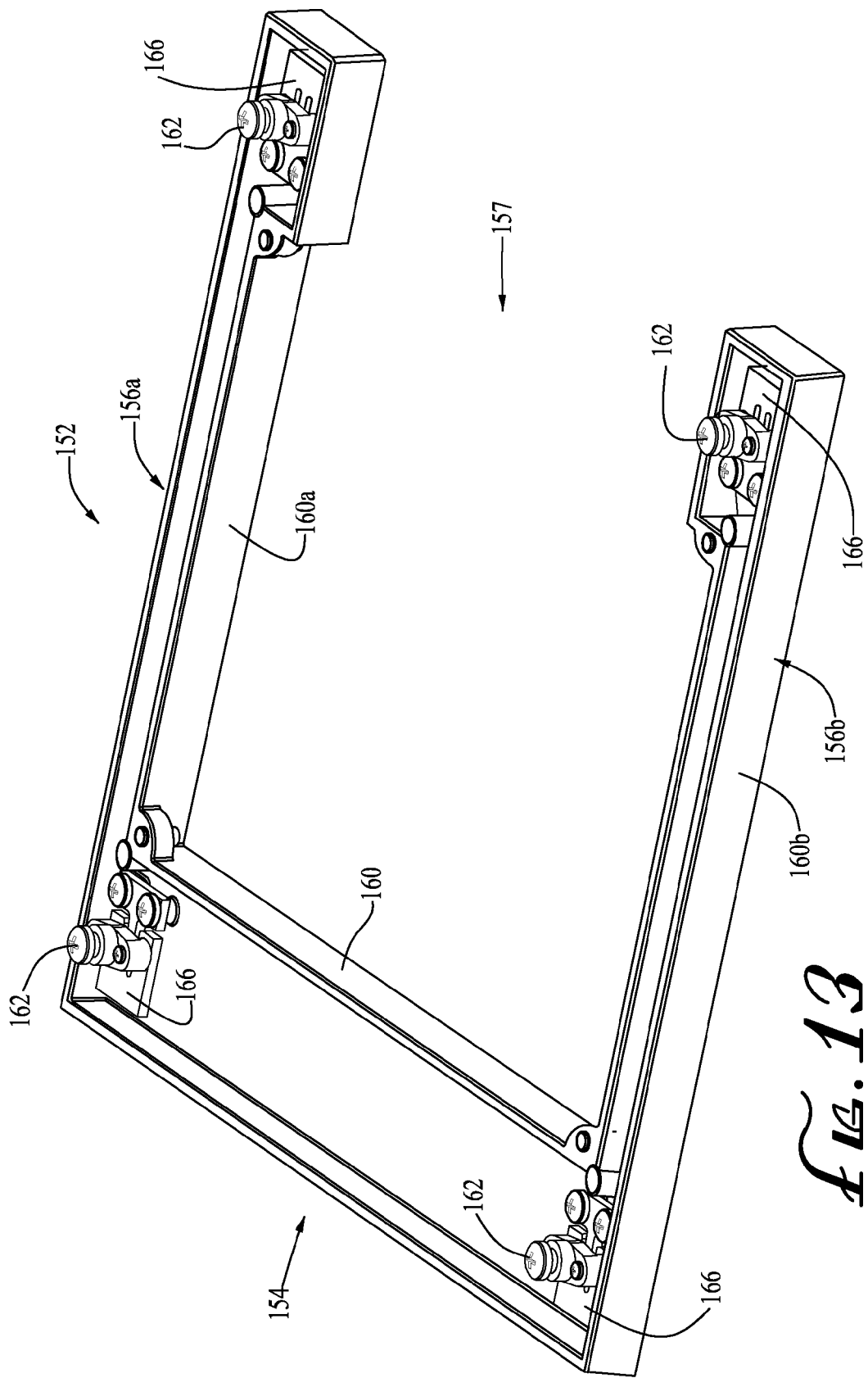
FIG. 13 is a perspective view of the planar beam scale of FIG. 12, without a top cover.

FIG. 13 is a perspective view of the planar beam scale 152 of FIG. 12 with the top cover removed to show the load cells 166. The load cells 166 shown in FIG. 12 are secured to a casing 160 comprising a base portion and two arm portions 160a/b. The base portion of the casing 160 is configured to support electronics and/or a chip (not shown) that processes the electronic signals generated by the planar beam load cells 166 in response to force exerted thereon. Accordingly, the base portion of the casing 160 may have a larger surface area than the arm portions 160a/b of the casing. In the depicted embodiment, four load cells 166 measure an applied downward force to determine the weight of an object. One load cell 166 is positioned in each of four corners of the "U-shaped" casing 160. The top cover screws 162, in addition to securing the top cover, also couple the top cover 158 to the load cells 166, as shown in FIG. 13 and in FIG. 13A and described more fully below with reference to FIG. 13A. Coupling the top cover 158 to the load cells enables transfer of a load on a platter that is in contact with the top cover to the load cells 166.

With continued reference to FIG. 13, the scale 152 comprises a U shape (i.e. C shape), as previously noted, having three sides: a base portion 154, a leading arm portion 156a, and a trailing arm portion 156b. It will be appreciated that in another embodiment the scale 152, including the casing 160, can include a fourth side, substantially creating a square-shaped ring. Stated differently, the scale 152 could be implemented as four separate rails defining an inner area. In fact, the casing 160 of the scale 152 can comprise any shape, without affecting functioning of the scale. However, the "U-shape" (i.e. "C-shape") defines an inner area 157, which allows the scale 152 to substantially straddle, or encircle, for example, bottom imaging components (see FIG. 15). The U-shaped scale 152 can substantially wrap around bottom reading imagers and optics. The U-shaped scale can also be configured to allow plenty of room for any electronics. Moreover, the U-shape enables access to the inner area 157, positioned between the two arm portions 156a/b and adjacent the base portion. The access to the inner area 157 conveniently allows for passage of electrical cables to and from any bottom imaging components, or other portions of a scanner-scale.

FIG. 13A is a close-up perspective view of a load cell 166 secured to a casing 160 of a planar beam scale. The load cell 166 comprises a fixed side 170, a live load side 172, and a center beam 171 positioned between the fixed side 170 and the live load side 172. FIG. 13B depicts the load cell 166 of FIG. 13A separate from the casing. In the embodiment of FIG. 13A, the fixed side 170 of the load cell 166 is configured to be secured to the casing 160 by one or more load cell securement screws 174 inserted through mounting holes 175. One or more metal bosses 176 protrude up from the floor of the casing 160, to suspend the live load side 172 and allow the center beam 171 to flex and bend in response to force applied to the live load side 172. The center beam 171 is narrow relative to other portions of the load cell so as to be more flexible, or to bend more easily. One or more strain gauges 173 (shown schematically in a broken line) are positioned on the top or the underside of the center beam 171 to measure the stretching and compression of the center beam 171 as it bends under a force applied to the live load side 172.

In the embodiment of FIG. 13A, the live load side 172 of the load cell 166 further comprises two extensions 172a/b, which extend from the live load side 172 back toward the fixed side 170, parallel to the center beam 171. The mounting holes 181a/b on 172a/b are located at the midpoint of center beam 171 in order to transfer the force from the screw 162 along the midpoint of the center beam 171. This causes center beam 171 to bend in an S shape. The one or more strain gauges 173 on the top or underside of center beam 171 measure the compression and tension along the length of center beam 171, registering this strain as proportional to the applied force. Torque loads (which would exist if the load were applied at the end of the live load rather than at the mounting holes) are nulled by the electronics connected to the one or more strain gauges, as the strain gauges would be in either compression or tension, rather than one gauge being in compression and the other in tension, if the center beam 171 was bent in an "S" shape.

As shown in FIG. 13A, a rubber load mount 182 is positioned above the load cell 166, in abutment with the mounting holes 181a/b of the extensions 172a/b and suspended over the center beam 171. By straddling the center beam 171, the rubber load mount 182 ensures that a downward force applied to a load cell is applied to the mounting holes 181a/b of the extensions 172a/b rather than directly to the center beam. The rubber load mount 182 is secured through the mounting holes 181a/b to the free ends of the extensions 172a/b with rubber load mount securement screws 180. The rubber mount 182 comprises a top cover support ring 178 configured to abut against and support the underside of the top cover 158 (depicted in FIG. 12). The top cover 158 rests on the top cover support ring 178. A top cover screw 162 secures the top cover 158 to the rubber load mount. Accordingly, a load on the top cover exerts a downward force that is transferred from the top cover 158 to the rubber load mount 182 and to the extensions 172a/b of the live load side 172 of the load cell 166. The rubber mount 182 functions to balance and evenly distribute the downward force to the extensions 172a/b as the force is transferred to the load cell 166. The rubber mount is configured to reduce the effect of any force applied to the load cell in a lateral direction, and ensures that a load is equally applied to both extensions 172a/b of the live load side 172 of the load cell 166.

FIG. 14 is a perspective view of a planar beam scale 252, with the top cover to show another type load cell 266, according to one embodiment. The load cells 266 shown in FIG. 14 are secured to a casing 260 comprising a base portion and two arm portions 260a/b. The casing 260 and the top cover (not shown) may be substantially similar to the casing 160 and top cover 158 of FIGS. 12 and 13. In the depicted embodiment, four load cells 266 measure an applied downward force to determine the weight of an object. One load cell 266 is positioned in each of four corners of the "U-shaped" casing 260. Although not shown, top cover screws similar to the top cover screws 162 shown in FIGS. 13 and 13A may secure a top cover and also couple the top cover to the load cells 266.

Although the scale 252 comprises a U shape (i.e., C shape), it will be appreciated that other shapes are possible without affecting functioning of the scale. However, the U-shape (i.e., C-shape) defines an inner area 257, which allows the scale 252 to substantially straddle, or encircle, for example, bottom imaging components (see FIG. 15). As previously described, the U-shape can also be configured to allow plenty of room for any electronics and to enable access to the inner area 257 for passage of electrical cables to and from any bottom imaging components, or other portions of a scanner-scale.

FIG. 14A is a close-up perspective view of a load cell 266 of FIG. 14 secured to a casing 260 of a planar beam scale. FIG. 14B is a perspective view of a load cell of FIG. 14, separate from the casing 260. A load cell 266 may comprise mounting tabs 272, planar beams 273, a load mount support 286, a live load portion 290, and a fixed side 292. The mounting tabs 272 are positioned at opposing lateral sides of the load cell 266. The load cell 266 is secured to the casing 260 with one or more load cell securement screws 274 inserted (or received) into mounting holes 275 though the mounting tabs 272. One or more metal bosses, similar to the bosses 176 shown in FIG. 13A, may protrude up from the floor of the casing 260 and the load cell securement screws 274 may secure to the bosses. The bosses abut the underside of the mounting tabs 272 of the load cell 266 and suspend the live load portion 290, allowing the planar beams 273 to flex and bend in response to force applied to the live load portion 290. One or more strain gauges 271 (schematically shown in a broken line) are positioned on the top or underside of the planar beams 273 to measure the stretching and compression of the planar beams 273 as they bend under a force applied to the live load portion 290.

In the depicted load cell of FIG. 14A and FIG. 14B, the live load portion 290 of the load cell 266 comprises a load mount support 286, which provides a substantially flat surface on which a load mount 278 is positioned. The load mount support 286 extends from a load side 294 back toward the fixed side 292, parallel to the planar beams 273. A downward force (or load) applied to the load mount support 286 causes the planar beams 273 to bend in an S shape. The one or more strain gauges 271 on the top or underside of the planar beams 273 measure the compression and tension along the length of the planar beams 273, registering this strain as proportional to the applied force.

The load mount 278 may be formed of rubber or other elastomeric material to compensate for lateral forces, which can negatively impact accuracy of a scale. The load mount 278 is configured to rest on and abut against the load mount support 286 and to abut against and support the underside of a top cover 158 (depicted in FIG. 12). The load mount may be configured to receive a top cover screw 162 (depicted in FIG. 12). The top cover 158 rests on the load mount 278 and the top cover screw 162 secures the top cover 158 to the load mount 278. Accordingly, a load on the top cover exerts a downward force that is transferred from the top cover 158 to the load mount 278 and to the load mount support 286 of the live load portion 290. The load mount 278 functions to balance and evenly distribute the downward force to the load mount support 286 as the force is transferred to the load cell 266. The rubber mount is configured to reduce the effect of any force applied to the load cell in a lateral direction, and ensures that a load is uniformly transferred to the load mount support 286 of the load cell 266.

Other embodiments of a planar beam scale may comprise load cells having different configurations and securement means, yet embody the same fundamental concepts just described. For example, the fixed side of the load cell may be secured to the casing of a planar beam scale by means other than securement screws. Rather than screws, rivets, clips, brackets, buttons detents, or other suitable securement apparatus can be utilized. Similarly, in another embodiment, the rubber load mount can be secured to the load cell by rivets, clips, brackets, buttons, detents, or other suitable securement apparatus. In still another embodiment, the top cover can be secured to the rubber load mount by rivets, clips, brackets, buttons, detents, snaps, hooks and loops, or any suitable securement apparatus.

Still another embodiment may be configured such that a weigh platter of a scanner scale of a scanner-scale is secured directly to the rubber load mounts positioned on top of the load cells. Essentially, the weigh platter may function as the top cover of the planar beam scale. In still another embodiment, the load mounts may be formed of an elastomeric material other than rubber. For example, the load mounts may be formed of a flexible plastic or an elastomeric composite material. In still another embodiment, the live load side of the load cell is suspended above the floor of the casing because a depression is formed in the casing floor beneath the live load side of the load cell. The depression, rather than metal bosses, functions to suspend the live load side of the load cell.

Still another embodiment may comprise a plurality of separate load cells secured within a frame of a scanner scale. Rather than being secured to a casing 160 having arms 160a/b, the load cells can be secured to a protrusion in the bottom of a frame, such as the frame 4 depicted in FIGS. 1 through 4. Similarly, the four separate load cells may not require a top cover, but rather the weigh platter can function as a top cover. The weigh platter can directly abut, and be secured to, the rubber load mount.

FIG. 15 is a perspective view of an imaging scanner-scale 2 having a scanner, a scale, and POS electronics integrated therein, according to one embodiment. The planar beam scale 152 (shown and designated in FIG. 12) fits within the frame 4 of the scanner-scale 2. The U-shape of the planar beam scale 152 enables the planar beam scale 152 to partially encircle the bottom imaging components, including the bottom imagers 12a/b and the bottom imaging mirrors 13a/b, 14a/b, 15a/b. In the depicted embodiment, the base portion 154 of the planar beam scale is positioned parallel with the customer side 17 of the scanner-scale 2. Although the base portion 154 of the planar beam scale is depicted as positioned on the customer side 17 of the scanner scale, it should be appreciated that the base portion 154 can be positioned on the checker side 16 of the scanner scale.

The arm portions 156a/b of the planar beam scale extend from the base portion 154 positioned on the customer side 17 of the scanner-scale toward the checker side 16 of the scanner scale. The arm portions 156a/b are positioned along the sides of the scanner-scale 2 between the rails of the frame 4 and the bottom imagers 12a/b and the bottom imaging mirrors 13a/b, 14a/b, 15a/b. The planar beam scale 152 is also sized and positioned to not interfere with proper functioning of side imagers 8a/b and the side imaging mirrors 9a/b. The weigh platter 6 is supported by the contact pads 164 on top of the top cover 158 of the planar beam scale 152. The top cover screws 162 secure the top cover to the rubber load mounts as described above with reference to FIG. 13A. The top cover screws 162 are encircled by the contact pads 164. Accordingly, an object to be weighed when placed on the weigh platter 6 exerts a downward force on the weigh platter 6, which is transferred to the contact pads 164 of the top cover 158. The top cover 158 is secured to and supported by the rubber load mounts which transfer the downward force from the top cover 158 to the extensions of the load cell, as described above with reference to FIG. 13A.

FIG. 16 is a side cross-sectional side view of an imaging scanner-scale 2, according to one embodiment. The cross-section is along plane 16-16 as indicated in FIG. 15 showing a rail of frame 4 removed to reveal the planar beam scale 152. As shown, the planar beam scale 152 is secured within the frame 4 such that the contact pads 164 on top of the top cover 158 abut and support the weigh platter 6. In the embodiment of FIG. 16, the vertical profile of the planar beam scale is smaller than the vertical profile of the frame 4. Accordingly, the casing 160 of the planar beam scale is secured above the floor of the frame 4. The bottom imaging mirrors 13b, 15a are below the casing 160, while other bottom imaging components are positioned within the inner area of the planar beam scale as shown in FIG. 15. In another embodiment, the casing 160 my rest on and be secured to the floor of the frame 4. In the embodiment of FIG. 16, the planar beam scale 152 is also sized and positioned to be located between the side imagers 8a/b so as to not interfere with functioning of the side imagers.

The weigh platter 6 is weighed by the planar beam scale 152 along with an object that is placed on the weigh platter 6. The weight of the platter can easily be cancelled out of the measurement by "zeroing out" the scale prior to placing on the weigh platter 6 an object to be weighed. In the depicted embodiment, the side imaging mirrors 9a/b and the side imager housings 10a/b are positioned above the weigh platter 6. Accordingly, these components are also weighed with the weigh platter 6 and their weight can similarly be cancelled out of a weight measurement.

As described previously, the weigh platter 6 is supported on the contact pads 164 of the top cover. Accordingly, a force exerted on the platter, such as the weight of an object, is transferred from the weigh platter 6 to the top cover 158, and to the load cells of the planar beam scale 152 as described above with reference to FIG. 13A. The top cover 158 is preferably not secured relative to the frame 4 and can move vertically relative to the frame 4 as a downward force is applied to the platter. By contrast, the casing 160 is secured relative to the frame, such that the top cover can move vertically relative to the casing 160 and the frame 4.

Figure 18:
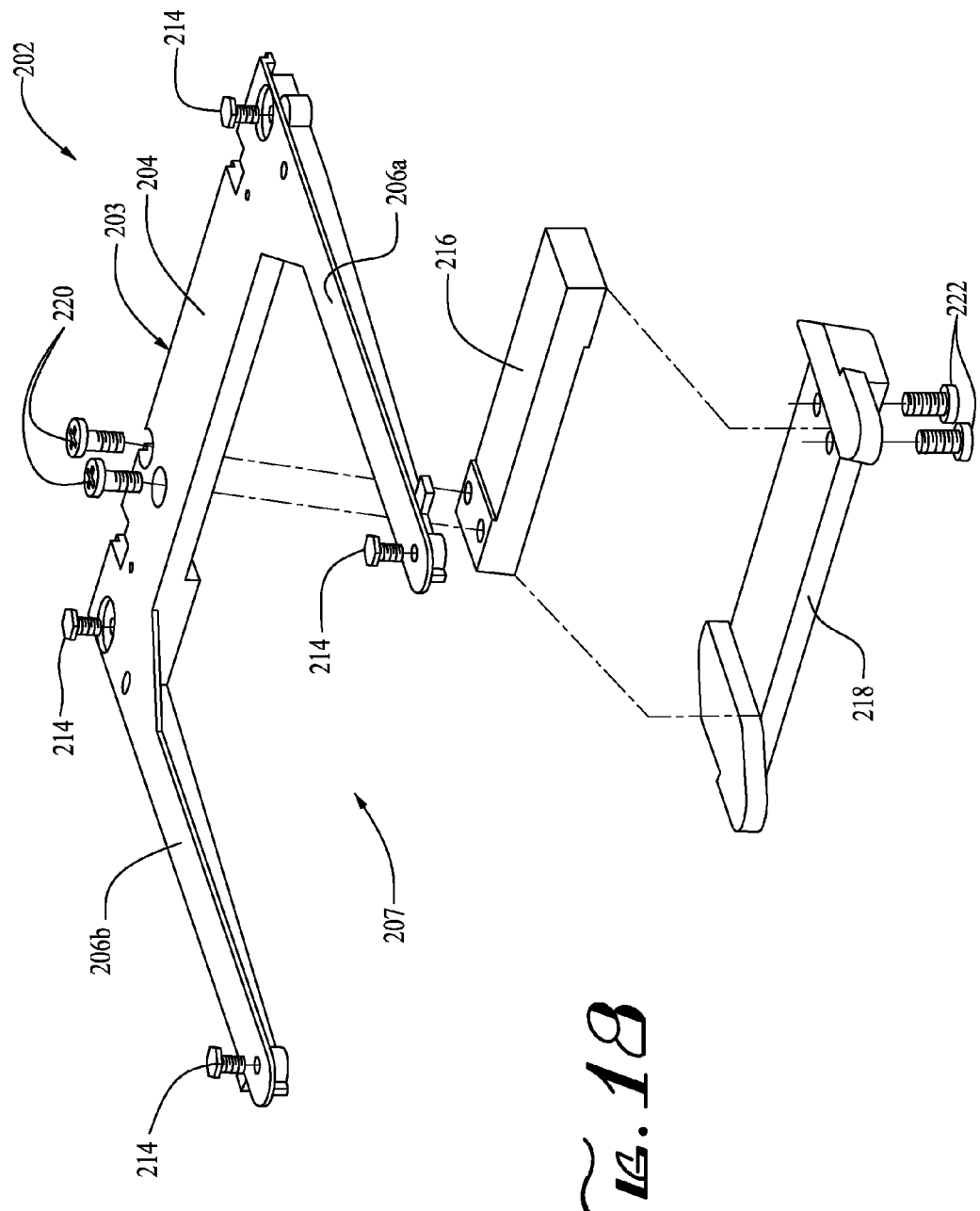
FIG. 18 is an exploded view of the bending beam scale of FIG. 16.

FIG. 17 is a perspective view of a bending beam scale 202 of an imaging scanner-scale, according to one embodiment. FIG. 18 is an exploded view of the bending beam scale of FIG. 17. The scale 202 comprises a spider (or weigh platter support) 203 having a base portion 204 and two arm portions 206a/b, a bending beam load cell 216, and a mount 218. The spider 203 is secured to the bending beam load cell 216 with one or more spider mounting screws 220. Similarly, the bending beam load cell 216 is secured to the mount 218 with one or more load cell mounting screws 222. Bending beam scales, employing bending beam load cell technology, are known. Accordingly, bending beam load cell and scale technology are not further discussed, except with reference to how a bending beam scale can be adapted for use in a scanner-scale according to the present disclosure.

The spider 203 is configured to support a weigh platter in a manner that does not interfere with any bottom imaging components and such that a downward force applied to the weigh platter is transferred to the spider 203. The base portion 204 and arm portions 206a/b of the spider 203 are configured in the shape of a "U" or a "C" (hereinafter referred to as "U-shape") and define an inner, partially enclosed area 207. It will be appreciated that in another embodiment the scale 202, including the spider 203, may include a fourth side, substantially creating a square-shaped ring. In fact, the spider 203 of the scale 202 may comprise any shape, without affecting functioning of the scale. However, the "U-shape" defines an inner area 207, which allows the scale 202 to substantially straddle, or encircle, for example, bottom imaging components in a manner similar to the planar beam scale shown in FIG. 15. The U-shaped scale 152 can substantially wrap around bottom reading imagers and optics. The U-shaped scale can also be configured to allow plenty of room for any electronics. Moreover, the U-shape enables access to the inner area 207, positioned between the two arm portions 206a/b and adjacent the base portion 204. The access to the inner area 207 conveniently allows for passage of electrical cables to and from any bottom imaging components, or other portions of a scanner-scale.

A plurality of contact pads 214 are positioned on the top surface of the spider 203. In the configuration of the illustrated embodiment, four contact pads 214 are distributed about four corners of the bending beam scale 202. In another embodiment, the contact pads 214 can be ring-shaped to surround a hole configured to accept a screw (or another securement means) that secures a weigh platter to the spider 203.

As can be appreciated, bending beam scale 202 can be positioned in a scanner-scale in a manner similar to the planar beam scale 152 of the scanner-scale 2 shown in FIG. 15. The "U" shape of the spider 203 can be positioned around the bottom imaging components, including any bottom imagers 12a/b and any bottom imaging mirrors 13a/b, 14a/b, 15a/b.

FIG. 19 is a front view of the bending beam scale of FIG. 17, showing the relative configuration and height of the components of bending beam scale 202. In the illustrated embodiment, spider 203 has an approximate thickness of ½ an inch (1.25 cm), as measured at the base portion from the top surface to the bottom surface adjacent the load cell. The spider 203 is formed of steel or other rigid material, to allow the vertical profile of the spider (or thickness) to be decreased from a typical thickness (which is generally approximately one inch (2.5 cm) thick when the spider is formed of aluminum). The bending beam load cell 216 has a vertical profile measuring approximately 7/10 of an inch (1.75 cm), as measured from the top surface adjacent the spider 203 to the bottom surface adjacent the mount 218. Mount 218 has vertical profile measuring approximately ½ an inch (1.25 cm), as measured from the top surface adjacent the bending beam load cell 216 to the bottom surface in abutment with a frame of the scanner-scale or other support surface. FIG. 19 further depicts a weigh platter 6 resting on contact pads 214 of spider 203. Weigh platter 6 has a vertical profile measuring approximately ¼ an inch (0.625 cm). Accordingly, the vertical profile of the scale 202 and weigh platter 6 resting thereon is approximately two inches.

Figure 20:
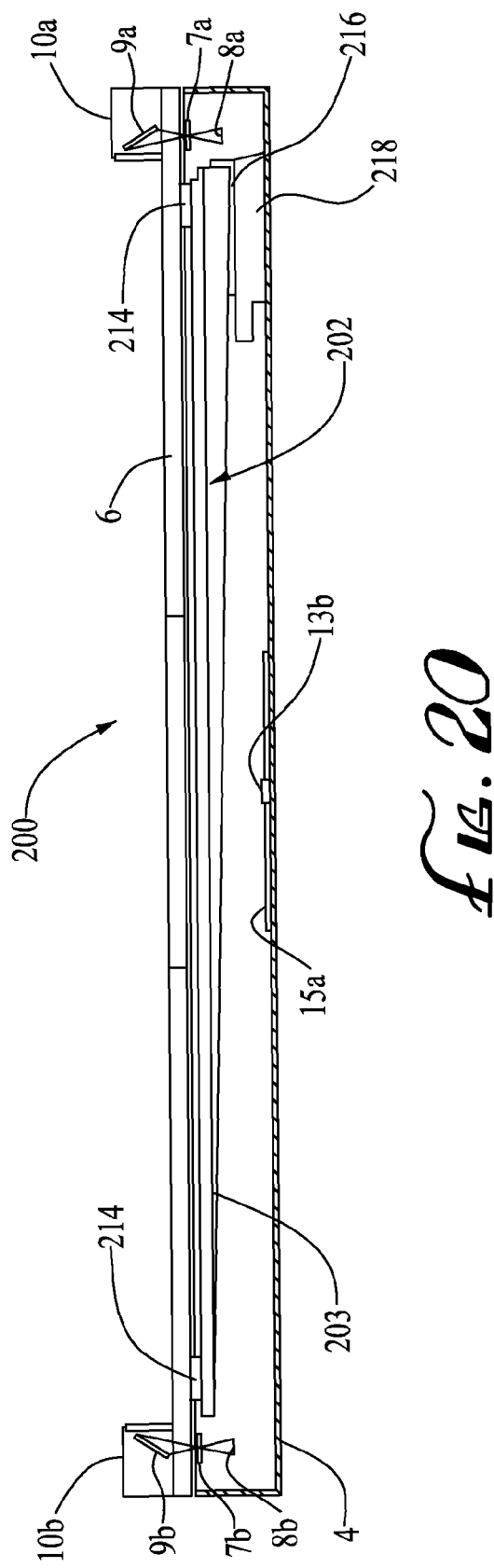
FIG. 20 is a cross-sectional side view of an imaging scanner scale having a bending beam scale, according to one embodiment.

FIG. 20 is a cross-sectional side view of an imaging scanner scale 200 having a bending beam scale, according to one embodiment. The cross-section is taken along a plane of scanner-scale 200 that is analogous to the plane 16-16 as indicated in FIG. 15, showing a rail of frame 4 removed to reveal the bending beam scale 202. The bending beam scale 202 is secured within the frame 4 such that the contact pads 214 on top of the spider 203 abut and support the weigh platter 6. Mount 218 is secured to the floor or bottom of frame 4 or to a similar support surface. The bottom imaging mirrors 13b, 15a are shown below the spider 203, while other bottom imaging components are positioned within the inner area 207 (see FIG. 17) of the bending beam scale 202. In the embodiment of FIG. 20, the bending beam scale 202 is also sized and positioned to be located between the side imagers 8a/b so as to not interfere with functioning of the side imagers.

The weigh platter 6 is weighed by the bending beam scale 202 along with an object that is placed on the weigh platter 6. The weight of the weigh platter 6 can easily be cancelled out of the measurement by "zeroing out" the scale prior to placing an object to be weighed on the weigh platter 6. In the depicted embodiment, the side imaging mirrors 9a/b and the side imager housings 10a/b are positioned above the weigh platter 6. Accordingly, these components are also weighed with the weigh platter 6 and their weight can similarly be cancelled out of a weight measurement.

As described previously, the weigh platter 6 is supported on the contact pads 214 on the top surface of the spider 214. Accordingly, a force exerted on the platter, such as the weight of an object, is transferred from the weigh platter 6 to spider, and to the load cell 216 of the bending beam scale 202. The spider 203 is not secured relative to the frame 4 and can move vertically relative to the frame 4 as a downward force is applied to the platter.

Figure 21:
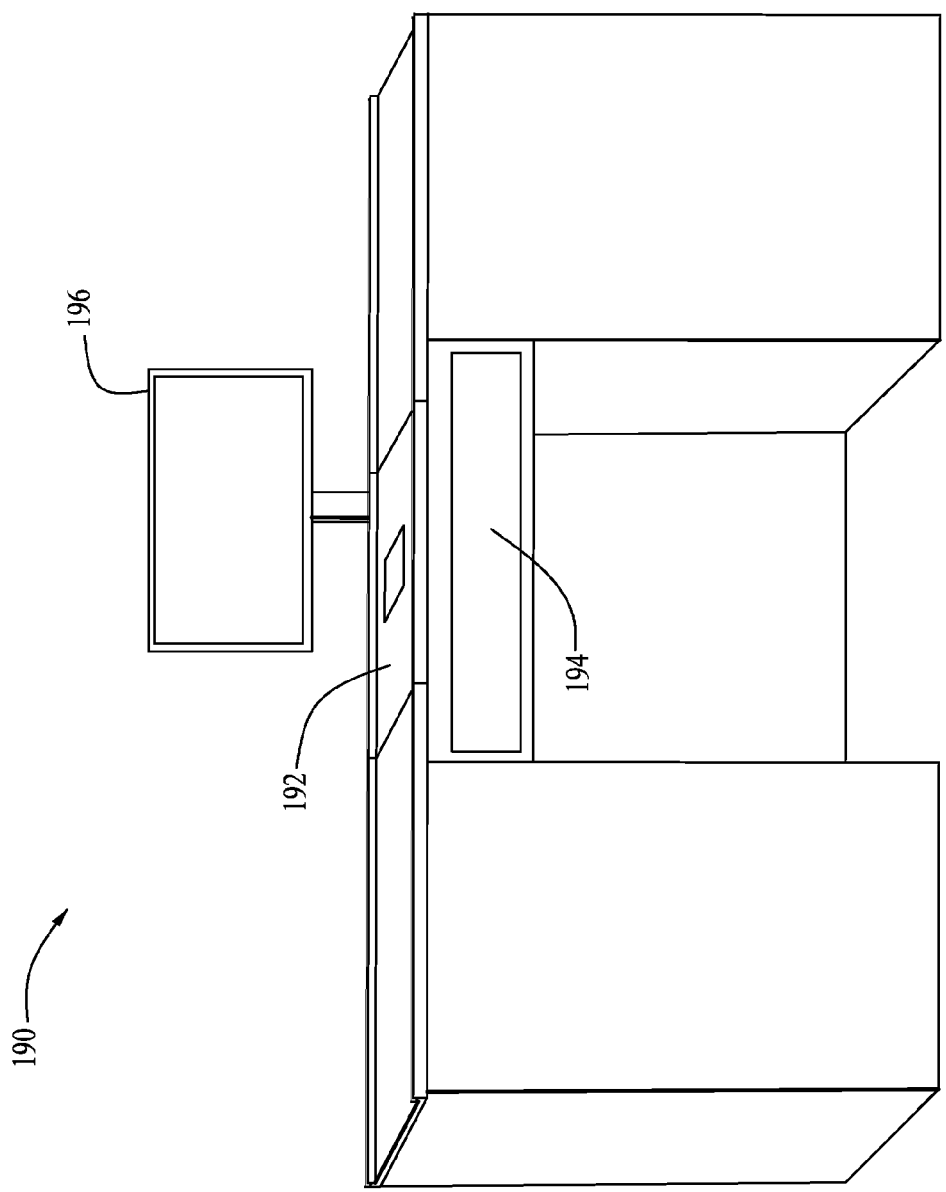
FIG. 21 is a perspective view of a check stand having an imaging scanner-scale, according to one embodiment.

FIG. 21 is a perspective view of a redesigned check stand 190 having an imaging scanner-scale 192 with a low vertical profile. The layout of the check stand 190 may occupy less space and may be more ergonomic than prior designs. With the cash drawer 194 positioned below the scanner-scale 192, the checker may ergonomically operate the check stand 190 while seated on a stool or chair. The scanner-scale 192 of FIG. 17 can incorporate the electronics of a POS terminal as depicted, or can connect to a separate POS terminal. A monitor 196 is positioned to allow the checker to easily view information obtained from successful scans and from weighing items. In an integrated embodiment, the monitor 196 may be connected to the scanner-scale 192 and appear like a conventional bioptic scanner, with the vertical window being replaced with a narrower profile POS display.

Figure 22:
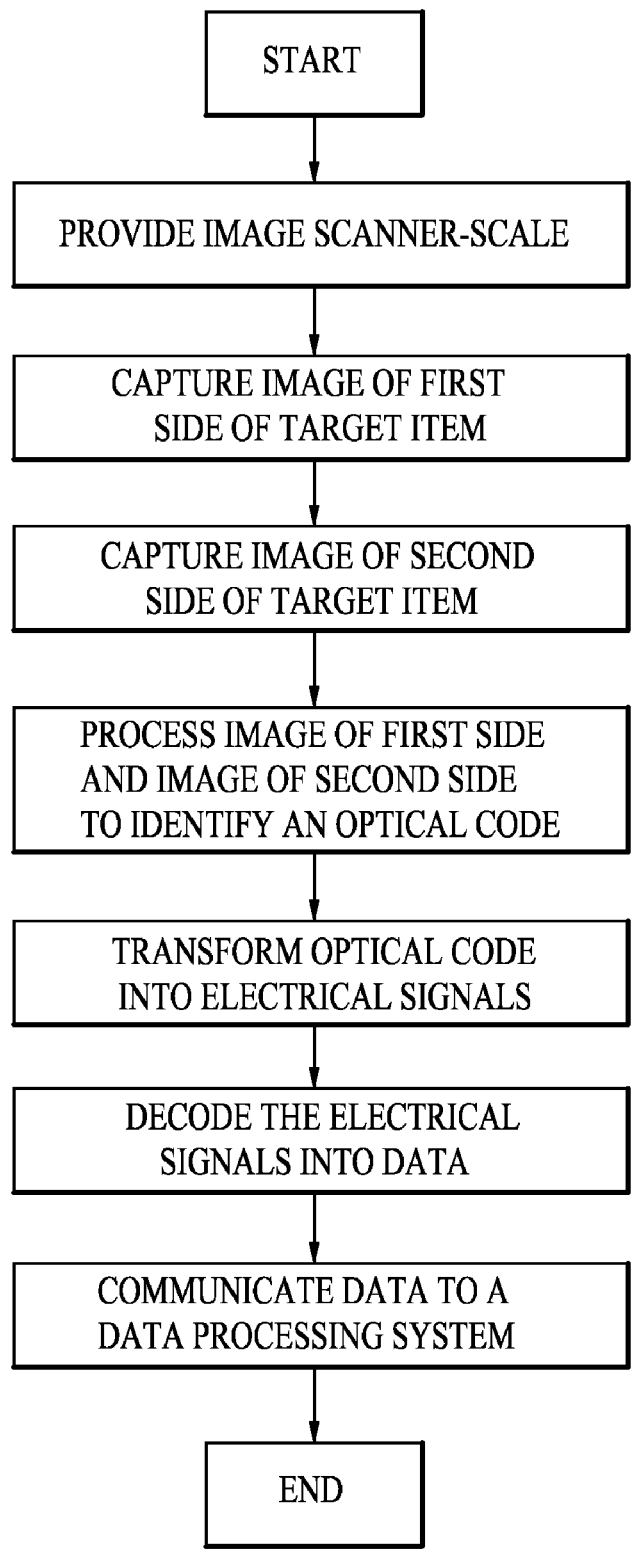
FIG. 22 is a flow diagram of method of scanning an optical code on an item, according to one embodiment.

FIG. 22 is a flow diagram of a method 300 of scanning an optical code on an item, according to an embodiment of the present disclosure. At step 302, an imaging scanner-scale, according to the present disclosure is provided. The provided imaging scanner-scale may comprise a weigh platter, a scale positioned below the weigh platter to support the weigh platter and to weigh an item placed on the weigh platter, a first side imager, and a second side imager. The first side imager may be positioned at a first side of the weigh platter and have a field of view (FOV) directed across the weigh platter toward a second side of the weigh platter. A portion of the FOV of the first side imager may at least partially define a scan volume. The second side imager may be positioned at the second side of the weigh platter and having a FOV directed across the weigh platter toward the first side of the weigh platter. A portion of the FOV of the second side imager may at least partially define the scan volume. The first and second side imagers are positioned adjacent to the plane of the weigh platter and configured to capture an image of an item within their respective FOVs when the item is passed through the scan volume.

At step 304, an image of a first side of a target item is captured with the first side imager as the target item is passed through the scan volume. Also, at step 306, an image of a second side of the target item is captured with the second side imager as the target item is passed through the scan volume. At step 308, the image of the first side of the target item and the image of the second side of the target item are processed to identify an optical code. The processing 308 of the images may be accomplished by circuitry internal to the imaging-scanner scale. In another embodiment, the processing may be accomplished external to the imaging-scanner scale. At step 310, the identified optical code is transformed into electrical signals. The electrical signals are decoded at step 312 into data and at step 314 the data is communicated to a data processing system. The data processing system can then use the data to, for example, perform such functions as lookup price information for the item and award rewards points to the customer based on a purchase of the item.

Various modifications, changes, and variations apparent to those of skill in the art may be made in the arrangement, operation, and details of the methods and systems of the disclosure without departing from the spirit and scope of the disclosure. Thus, it is to be understood that the embodiments described above have been presented by way of example, and not limitation.

Where a range of values is provided, it is understood that each intervening value, to the tenth of the unit of the lower limit unless the context clearly dictates otherwise, between the upper and lower limit of that range and any other stated or intervening value in that stated range is encompassed within the embodiments of the present invention. The upper and lower limits of these smaller ranges which may independently be included in the smaller ranges is also encompassed within the embodiments of the invention, subject to any specifically excluded limit in the stated range. Where the stated range includes one or both of the limits, ranges excluding either both of those included limits are also included in the embodiments of the invention.

Unless defined otherwise, all technical and scientific terms used herein have the same meaning as commonly understood by one of ordinary skill in the art to which the embodiments of the invention belong. Although any methods and materials similar or equivalent to those described herein can also be used in the practice or testing of the embodiments of the present invention, the preferred methods and materials are now describe. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the embodiments of the present invention are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the invention. It should be understood that various features and aspects of the disclosed embodiments can be combined with or substituted for one another in order to form varying modes of the disclosed embodiments of the present invention. Thus, it is intended that the scope of at least some of the present invention herein disclosed should not be limited by the particular disclosed embodiments described above.

Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. An imaging scanner-scale comprising:
a weigh platter having a top surface that defines a horizontal plane, wherein the weigh platter is configured to be positioned such that the top surface is level with a counter at a point-of-sale (POS);
a scale positioned below the weigh platter to support the weigh platter and weigh an item placed on the weigh platter;
a side imager positioned at a first side of the weigh platter and having a field of view (FOV) directed across the weigh platter toward a second side of the weigh platter, wherein a portion of the FOV at least partially defines a scan volume, and wherein the side imager is positioned adjacent to the plane of the weigh platter and configured to capture an image of at least a first side of an item within the FOV when the item is passed through the scan volume; and
an optical component affixed upon the weigh platter and positioned at the first side of the weigh platter, adjacent to and above the plane of the weigh platter, wherein the optical component is constructed and arranged to direct the FOV of the side imager across the weigh platter, and wherein the FOV from the optical component to the scan volume is above the plane of the weigh platter.

2. An imaging scanner-scale of claim 1, wherein the optical component is a mirror constructed and arranged to fold the FOV from the imager to the scan volume, and wherein at least a portion of the side imager is positioned below the plane of the weigh platter.

3. An imaging scanner-scale of claim 1, wherein the optical component is a lens.

4. An imaging scanner-scale of claim 1, wherein the optical component is an optical prism.

5. An imaging scanner-scale of claim 1, further comprising a frame configured to secure the scale, wherein the frame at least partially encloses the scale, and wherein the top surface of the weigh platter is no more than about two inches (5 cm) above a bottom surface of the frame.

6. An imaging scanner-scale of claim 1, further comprising a second side imager positioned at the second side of the weigh platter and having a FOV directed across the weigh platter toward the first side of the weigh platter, wherein a portion of the FOV of the second side imager at least partially defines the scan volume, wherein the second side imager is positioned adjacent to the plane of the weigh platter and configured to capture an image of at least a second side of the item within the FOV of the second side imager when the item is passed through the scan volume; and
a second optical component affixed to and positioned at the second side of the weigh platter, adjacent to and above the plane of the weigh platter, wherein the second optical component is constructed and arranged to direct the FOV of the second side imager across the weigh platter, and wherein the FOV of the second side imager from the second optical component to the scan volume is above the plane of the weigh platter.

7. An imaging scanner-scale of claim 1, further comprising a bottom imager positioned below the weigh platter, wherein the weigh platter comprises a window, and wherein a FOV of the bottom imager is directed through the window of the weigh platter to enable the bottom imager to capture an image of at least a third side of the item when the item is passed through the scan volume.

8. An imaging scanner-scale of claim 7, further comprising a plurality of bottom imaging mirrors configured to direct the FOV of the bottom imager through the window of the weigh platter, a first of the plurality of bottom imaging mirrors having one of an aperture, a transparent portion, and a lens, wherein the FOV of the bottom imager is directed through the first bottom imaging mirror.

9. An imaging scanner-scale of claim 1, wherein the scale comprises a planar beam scale having a planar beam load cell.

10. An imaging scanner-scale of claim 1, wherein the scale comprises a bending beam scale having a bending beam load cell.

11. An imaging scanner-scale comprising:
a weigh platter having a top surface that defines a horizontal plane, wherein the weigh platter is configured to be positioned such that the top surface is level with a counter at a point-of-sale (POS);
a scale positioned below the weigh platter to support the weigh platter and weigh an item placed on the weigh platter;
a side imager positioned at a first side of the weigh platter and having a field of view (FOV) directed across the weigh platter toward a second side of the weigh platter, wherein a portion of the FOV at least partially defines a scan volume, and wherein the side imager is positioned adjacent to the plane of the weigh platter and configured to capture an image of at least a first side of an item within the FOV when the item is passed through the scan volume; and an optical component positioned at the first side of the weigh platter, adjacent to and above the plane of the weigh platter, wherein the optical component is constructed and arranged to direct the FOV of the side imager across the weigh platter, and wherein the FOV from the optical component to the scan volume is above the plane of the weigh platter, wherein the optical component is a lens, and wherein the lens is a component of the side imager, such that the side imager is positioned at least partially above the weigh platter.

12. An imaging scanner-scale comprising:

a weigh platter having a top surface that defines a horizontal plane, wherein the weigh platter is configured to be positioned such that the top surface is level with a counter at a point-of-sale (POS);

a scale positioned below the weigh platter to support the weigh platter and weigh an item placed on the weigh platter;

a side imager positioned at a first side of the weigh platter and having a field of view (FOV) directed across the weigh platter toward a second side of the weigh platter, wherein a portion of the FOV at least partially defines a scan volume, and wherein the side imager is positioned adjacent to the plane of the weigh platter and configured to capture an image of at least a first side of an item within the FOV when the item is passed through the scan volume; and an optical component positioned at the first side of the weigh platter, adjacent to and above the plane of the weigh platter, wherein the optical component is constructed and arranged to direct the FOV of the side imager across the weigh platter, and wherein the FOV from the optical component to the scan volume is above the plane of the weigh platter, wherein a measurement from a top surface of the weigh platter to a bottom surface of the scale is not greater than two inches (5 cm).

13. An imaging scanner-scale comprising:

a weigh platter having a top surface that defines a horizontal plane, wherein the weigh platter is configured to be positioned such that the top surface is level with a counter at a point-of-sale (POS);

a scale positioned below the weigh platter to support the weigh platter and weigh an item placed on the weigh platter;

a side imager positioned at a first side of the weigh platter and having a field of view (FOV) directed across the weigh platter toward a second side of the weigh platter, wherein a portion of the FOV at least partially defines a scan volume, and wherein the side imager is positioned adjacent to the plane of the weigh platter and configured to capture an image of at least a first side of an item within the FOV when the item is passed through the scan volume; and an optical component positioned at the first side of the weigh platter, adjacent to and above the plane of the weigh platter, wherein the optical component is constructed and arranged to direct the FOV of the side imager across the weigh platter, and wherein the FOV from the optical component to the scan volume is above the plane of the weigh platter, wherein a top surface of the optical element is no more than about ½ inch (1.25 cm) above the top surface of the weigh platter and the optical component is not greater than about ½ of an inch (1.25 cm).

14. An imaging scanner-scale comprising:

a weigh platter having a top surface that defines a horizontal plane, wherein the weigh platter is configured to be positioned such that the top surface is level with a counter at a point-of-sale (POS);

a scale positioned below the weigh platter to support the weigh platter and weigh an item placed on the weigh platter;

a side imager positioned at a first side of the weigh platter and having a field of view (FOV) directed across the weigh platter toward a second side of the weigh platter, wherein a portion of the FOV at least partially defines a scan volume, and wherein the side imager is positioned adjacent to the plane of the weigh platter and configured to capture an image of at least a first side of an item within the FOV when the item is passed through the scan volume; and an optical component positioned at the first side of the weigh platter, adjacent to and above the plane of the weigh platter, wherein the optical component is constructed and arranged to direct the FOV of the side imager across the weigh platter, and wherein the FOV from the optical component to the scan volume is above the plane of the weigh platter;

a bottom imager positioned below the weigh platter, wherein the weigh platter comprises a window, and wherein a FOV of the bottom imager is directed through the window of the weigh platter to enable the bottom imager to capture an image of at least a third side of the item when the item is passed through the scan volume;

a second bottom imager positioned below the weigh platter and having a FOV directed through the window of the weigh platter to capture an image of at least a portion of the third side and a portion of a fourth side of the item when the item is passed through the scan volume;

a first plurality of bottom imaging mirrors configured to direct the FOV of the first bottom imager through the window of the weigh platter, wherein a first mirror of the first plurality of bottom imaging mirrors has one of an aperture, a transparent portion, and a lens, and wherein the FOV of the second bottom imager is directed through the first mirror of the first plurality of bottom imaging mirrors; and a second plurality of bottom imaging mirrors configured to direct the FOV of the second bottom imager through the window of the weigh platter, wherein a second mirror of the second plurality of bottom imaging mirrors has one of an aperture, a transparent portion, and a lens, and wherein the FOV of the first bottom imager is directed through the second mirror.

15. An imaging scanner-scale comprising:

a weigh platter;

a scale positioned below the weigh platter and supporting the weigh platter to weigh items placed on the weigh platter;

a frame configured to secure the scale, wherein the frame at least partially encloses the scale;

a side imager configured to capture images of items within a field of view (FOV) of the side imager, the FOV directed across a central region of the weigh platter and at least partially defining a scan volume, wherein the imager is configured to capture an image of at least a first side of an item within the FOV when the item is passed through the scan volume; and an optical component positioned above the weigh platter at a first side of the weigh platter and configured to direct the FOV of the side imager across the weigh platter, wherein a top surface of the optical component is no more than ½ of one inch (1.25 cm) above the top surface of the weigh platter, and wherein the FOV from the optical component to the scan volume is above the weigh platter, wherein the scanner-scale has a depth, as measured from a top surface of the weigh platter to a bottom surface of the frame, that is less than two inches (5 cm).

16. An imaging scanner-scale of claim 15, further comprising:
a second side imager configured to capture images of items within a FOV of the second side imager, the FOV of the second side imager being directed substantially across a central region of the platter and at least partially defining the scan volume, wherein the second side imager captures an image of a second side of the item within the FOV of the second side imager when the item is passed through the scan volume; and an second optical component positioned above the weigh platter at a second side of the weigh platter and configured to direct the FOV of the second side imager across the weigh platter, wherein a top surface of the second optical component is no more than about ½ an inch (1.25 cm) above the top surface of the weigh platter, and wherein the FOV of the second side imager from the second optical component to the scan volume is above the weigh platter.

17. An imaging scanner-scale of claim 15, further comprising a bottom imager positioned below the weigh platter, wherein a FOV of the bottom imager is directed through a window in the weigh platter to enable the bottom imager to capture an image of at least a third side of the item when the item is passed through the scan volume.

18. An imaging scanner-scale of claim 15, wherein the scale comprises a planar beam scale having a planar beam load cell.

19. An imaging scanner-scale comprising:
a weigh platter;
a scale positioned below the weigh platter and configured to weigh items placed on the weigh platter;
a plurality of side imagers positioned proximate to each of four corners of the weigh platter, each of the plurality of side imagers having a field of view (FOV) directed substantially toward a position above the center of the platter, wherein a portion of the FOV of each of the plurality of side imagers at least partially defines a scan volume positioned above the center of the platter, and wherein each side imager is configured to capture an image of at least one side of an item within its respective FOV when the item is passed through the scan volume; and
a plurality of optical components each corresponding to at least one of the plurality of side imagers and each positioned at each of the four corners of the weigh platter, adjacent to and above the plane of the weigh platter, wherein each of the plurality of optical components is configured to direct the FOV of a corresponding side imager across the weigh platter, and wherein the FOV of the corresponding side imager from each of the plurality of optical components to the scan volume is above the plane of the weigh platter.

20. An imaging scanner-scale of claim 19, further comprising one or more bottom imagers positioned below the weigh platter and having a FOV directed through a window in the weigh platter to capture an image of the bottom of the item when the item is passed through the scan volume.

21. An imaging scanner-scale of claim 19, wherein the scale comprises a planar beam scale having a planar beam load cell.

22. An imaging scanner-scale comprising:
a weigh platter having a window and a top surface that defines a horizontal plane, wherein the weigh platter is configured to be positioned such that the top surface is level with a counter at a point-of-sale (POS);
a scale positioned below the weigh platter to support the weigh platter and weigh an item placed on the weigh platter;
a first bottom imager positioned below the weigh platter and having a field of view (FOV) that is directed through the window of the weigh platter, wherein a portion of the FOV at least partially defines a scan volume, and wherein the first bottom imager is configured to capture an image of at least a first side of an item within the FOV when the item is passed through the scan volume;
a first plurality of bottom imaging mirrors configured in an on-axis geometry comprising a first mirror having one of an aperture, a transparent portion, and a lens, and wherein the FOV of the first bottom imager is directed through the one of the aperture, the transparent portion, and the lens of the first mirror to direct the FOV of the first bottom imager through the window of the weigh platter.

23. An imaging scanner-scale of claim 22, further comprising:
a second bottom imager positioned below the weigh platter and having a FOV that is directed through the window of the weigh platter, wherein a portion of the FOV of the second bottom imager at least partially defines a scan volume, and wherein the second bottom imager is configured to capture an image of at least a portion of a second side of the item within the FOV when the item is passed through the scan volume;
a second plurality of bottom imaging mirrors configured in an on-axis geometry to direct the FOV of the second bottom imager through the window of the weigh platter.

24. An imaging scanner-scale of claim 23, wherein the FOV of the second bottom imager is directed through the first mirror of the first plurality of bottom imaging mirrors, and wherein the on-axis geometry of the second plurality of bottom imaging mirrors comprises a second mirror of the second plurality of bottom imaging mirrors having therethrough one of an aperture, a transparent portion, and a lens, and wherein the FOV of the first bottom imager is directed through the second mirror of the second plurality of bottom imaging mirrors.

25. A method of scanning an optical code on a target item being passed through a scan volume, the method comprising:
providing an imaging scanner-scale comprising:
a weigh platter having a top surface that defines a horizontal plane;
a scale positioned below the weigh platter to support the weigh platter and to weigh an item placed on the weigh platter;
a first side imager positioned at a first side of the weigh platter and having a field of view (FOV) directed across the weigh platter toward a second side of the weigh platter, wherein a portion of the FOV at least partially defines a scan volume, wherein the first side imager is positioned adjacent to the plane of the weigh platter;

a first optical component affixed to and positioned at the first side of the weigh platter, adjacent to and above the plane of the weigh platter, to direct the FOV of the first side imager across the weigh platter;

a second side imager positioned at the second side of the weigh platter, and having a FOV directed across the weigh platter toward the first side of the weigh platter, wherein a portion of the FOV of the second side imager at least partially defines the scan volume, wherein the second side imager is positioned adjacent to the plane of the weigh platter; and a second optical component affixed to and positioned at the second side of the weigh platter, adjacent to and above the plane of the weigh platter, to direct the FOV of the second side imager across the weigh platter;

capturing an image of a first side of a target item with the first side imager as the target item is passed through the scan volume;

capturing an image of a second side of the target item with the second side imager as the target item is passed through the scan volume; and processing the image of the first side of the target item and the image of the second side of the target item to identify an optical code.

* * * * *